(12) United States Patent
Ni

(10) Patent No.: US 10,397,188 B2
(45) Date of Patent: Aug. 27, 2019

(54) ACCESS CONTROL APPARATUS, SYSTEM, AND METHOD

(71) Applicant: Huawei Technologies Co., Ltd., Shenzhen (CN)

(72) Inventor: Hui Ni, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 49 days.

(21) Appl. No.: 15/675,069

(22) Filed: Aug. 11, 2017

(65) Prior Publication Data
US 2017/0339110 A1 Nov. 23, 2017

Related U.S. Application Data

(63) Continuation of application No. PCT/CN2015/073019, filed on Feb. 13, 2015.

(51) Int. Cl.
H04L 12/28 (2006.01)
H04L 29/06 (2006.01)
(Continued)

(52) U.S. Cl.
CPC .......... *H04L 63/0263* (2013.01); *H04L 45/38* (2013.01); *H04L 45/64* (2013.01);
(Continued)

(58) Field of Classification Search
CPC ....... H04L 12/46; H04L 12/66; H04L 12/741; H04L 12/851; H04L 29/06; H04L 29/06095; H04L 29/0653; H04L 45/38; H04L 45/64; H04L 45/74; H04L 47/2483; H04L 49/3009; H04L 49/309; H04L 63/0263; H04L 63/08; H04L 69/22;
(Continued)

(56) References Cited

U.S. PATENT DOCUMENTS 8,521,905 B2 * 8/2013 Beliveau ............... H04L 67/327 370/224
9,258,742 B1 * 2/2016 Pianigiani ............. H04L 67/327
(Continued)

FOREIGN PATENT DOCUMENTS

CN 103905447 A 7/2014
CN 103906074 A 7/2014
(Continued)

OTHER PUBLICATIONS

Haeffner, Network Based Services in Mobile Networks Context, Typical Use Cases, Problem Area, Requirements, IETF 87, 7 pages, Jul. 2013.*
(Continued)

*Primary Examiner* — Frank Duong
(74) *Attorney, Agent, or Firm* — Slater Matsil, LLP

(57) ABSTRACT

Embodiments of the present invention relate to the communications field, and provide an access control apparatus, system, and method. The method includes: receiving a first service chain forwarding rule sent by a controller; receiving a first packet sent by a classifier; and when a service chain identifier carried in the first packet matches a first service chain identifier in the first service chain forwarding rule, forwarding the first packet to a first access network element according to a first identifier.

20 Claims, 9 Drawing Sheets

(51) Int. Cl.
*H04W 48/08* (2009.01)
*H04W 88/12* (2009.01)
*H04L 12/721* (2013.01)
*H04L 12/715* (2013.01)
*H04L 12/851* (2013.01)
*H04L 12/741* (2013.01)

(52) U.S. Cl.
CPC ...... *H04L 47/2483* (2013.01); *H04L 63/0236* (2013.01); *H04W 48/08* (2013.01); *H04W 88/12* (2013.01); *H04L 45/74* (2013.01); *H04L 63/08* (2013.01); *H04L 69/22* (2013.01)

(58) Field of Classification Search
CPC ....... H04L 2012/46; H04L 2012/5618; H04W 40/36; H04W 48/08; H04W 88/12; H04W 40/22
See application file for complete search history.

(56) References Cited

U.S. PATENT DOCUMENTS

| | | | |
|---|---|---|---|
| 9,756,016 B2* | 9/2017 | Hua | H04L 63/0263 |
| 9,832,130 B2* | 11/2017 | Hu | H04L 12/6418 |
| 2013/0163427 A1 | 6/2013 | Beliveau et al. | |
| 2013/0272305 A1 | 10/2013 | Lefebvre et al. | |
| 2014/0269724 A1* | 9/2014 | Mehler | H04L 45/30 370/392 |
| 2014/0334295 A1 | 11/2014 | Guichard et al. | |
| 2015/0312894 A1 | 10/2015 | Chen et al. | |
| 2017/0019341 A1 | 1/2017 | Huang et al. | |
| 2017/0250917 A1* | 8/2017 | Ruckstuhl | H04L 45/306 |

FOREIGN PATENT DOCUMENTS

| | | |
|---|---|---|
| CN | 103999431 A | 8/2014 |
| CN | 104023335 A | 9/2014 |
| CN | 104247348 A | 12/2014 |
| CN | 104320278 A | 1/2015 |
| EP | 2993836 A1 | 3/2016 |
| WO | 2008093900 A1 | 8/2008 |
| WO | 2013023704 A1 | 2/2013 |
| WO | 2014185721 A1 | 11/2014 |
| WO | 2014198060 A1 | 12/2014 |

OTHER PUBLICATIONS

Zhang et al, StEERING: A Software-Defined Networking for Inline Service Chaining, IEEE, 10 pages, 2013.*
Open Networking Foundation (ONF), "The Benefits of Multiple Flow Tables and TTPs," Version No. 1.0, Feb. 2, 2015, ONF TR-510, pp. 1-9.
NEC, "Discussion on NFV Relationship to 3GPP," 3GPP TSG SA Plenary #63, SP-140095, Mar. 3, 2014, Fukuoka Japan, 10 pages.
Huawei et al., "One Alternative Solution for FMSS," SA WG2 Meeting #107, S2-150285, Jan. 26-30, 2015, Sorrento, Italy, 4 pages.

* cited by examiner

ACCESS CONTROL APPARATUS, SYSTEM, AND METHOD

CROSS-REFERENCE TO RELATED APPLICATIONS

This application is a continuation of International Application No. PCT/CN2015/073019, filed on Feb. 13, 2015, the disclosure of which is hereby incorporated by reference in its entirety.

TECHNICAL FIELD

The present invention relates to the communications field, and in particular, to an access control apparatus, system, and method.

BACKGROUND

A software-defined networking (SDN for short) concept is put forward in a current telecommunications network.

In SDN, network element control logic is decoupled from a forwarding function, and control logic is deployed in a centralized manner. A controller used to implement network element control logic flexibly controls a packet processing procedure by controlling a processing rule stored in a forwarder (Switch) that has a forwarding function. The forwarder matches a match field in a packet with a match field in the processing rule, and if the matching succeeds, performs various types of processing on the packet according to a corresponding action set in the processing rule.

In a mobile network, an SDN mechanism is mainly used in a service chaining solution of a Gi-LAN (Local Area Network) domain. The Gi-LAN domain is a network domain between a core network gateway and a packet data network (PDN for short). A basic idea of the service chaining solution is as follows: A forwarder connected to a service function SF for short) entity is deployed, and a forwarding rule corresponding to a service packet feature is deployed on the forwarder by using a controller. The forwarder forwards a received packet according to the forwarding rule, so that the packet flows through one or more SF entities, thereby completing service processing of the packet.

However, the SDN mechanism does not involve a radio access network including an access network element such as a base station. In addition, the Gi-LAN domain uses a service chain identifier for routing, but the radio access network uses a tunnel identifier in a user packet for routing. Their forwarding mechanisms are different. Therefore, different forwarding mechanisms used in different networks lead to complex implementation of control function logic, the forwarding mechanisms in the Gi-LAN domain and the radio access network cannot be unified, and SDN-mechanism-based control cannot be implemented on an access network element in the mobile network.

SUMMARY

In view of this, embodiments of the present invention provide an access control apparatus, system, and method, to implement SDN-mechanism-based control on an access network element in a mobile network. The technical solutions are as follows.

According to a first aspect, an access control apparatus is provided. The apparatus includes a receiver, configured to receive a first service chain forwarding rule sent by a controller, where the first service chain forwarding rule includes a first service chain identifier corresponding to a terminal, and a first identifier of a first access network element, and the first identifier of the first access network element corresponds to the first service chain identifier; receive a first packet sent by a classifier, where the first packet carries a service chain identifier. The apparatus also includes a processor, configured to: when the service chain identifier carried in the first packet matches the first service chain identifier in the first service chain forwarding rule, determine, according to the first identifier of the first access network element, that the first packet is to be sent to the first access network element. The apparatus also includes a transmitter, configured to forward the first packet to the first access network element.

With reference to the first aspect, in a first implementation of the first aspect, the first service chain forwarding rule is sent by the controller according to a first terminal access request, and the first terminal access request is initiated by the terminal through the first access network element.

With reference to the first aspect or the first implementation of the first aspect, in a second implementation of the first aspect, the receiver is further configured to: receive a second service chain forwarding rule sent by the controller according to a terminal handover request, where the second service chain forwarding rule includes the first service chain identifier and a second identifier of a second access network element, the second access network element is an access network element to which the terminal is handed over, and the second identifier corresponds to the first service chain identifier; and receive a second packet sent by the classifier, where the second packet carries a service chain identifier; the processor is further configured to: when the service chain identifier carried in the second packet matches the first service chain identifier in the second service chain forwarding rule, determine, according to the second identifier of the second access network element, that the second packet is to be sent to the second access network element; and the transmitter is further configured to: forward the second packet to the second access network element.

With reference to the first aspect or the first implementation of the first aspect, in a third implementation of the first aspect, the receiver is further configured to: receive a third service chain forwarding rule sent by the controller according to a terminal handover request, where the third service chain forwarding rule includes the first service chain identifier, the first identifier of the first access network element, and a second identifier of a second access network element, the second access network element is an access network element to which the terminal is handed over, and the first service chain identifier corresponds to the first identifier and the second identifier; and receive a third packet sent by the classifier, where the third packet carries a service chain identifier; the processor is further configured to: when the service chain identifier carried in the third packet matches the first service chain identifier in the third service chain forwarding rule, determine, according to the first identifier and the second identifier, that the third packet is to be sent to the first access network element and the second access network element; and the transmitter is further configured to: forward the third packet to the first access network element and the second access network element.

With reference to any one of the first aspect or the first to the third implementations of the first aspect, in a fourth implementation of the first aspect, the receiver is further configured to: receive a fourth service chain forwarding rule sent by the controller according to a terminal service setup request, where the fourth service chain forwarding rule includes a second service chain identifier corresponding to a service of the terminal, and identifiers of one or more service processing network elements, the one or more service processing network elements are network elements for processing the service, and the second service chain identifier corresponds to the identifiers of the one or more service processing network elements; and receive a fourth packet sent by the classifier, where the fourth packet carries at least two service chain identifiers; the processor is further configured to: when one of the at least two service chain identifiers carried in the fourth packet matches the second service chain identifier in the fourth service chain forwarding rule, determine, according to the identifiers of the one or more service processing network elements, that the fourth packet is to be sent to the one or more service processing network elements; the transmitter is further configured to: forward the fourth packet to the one or more service processing network elements for service processing; the receiver is further configured to: receive the service-processed fourth packet sent by the one or more service processing network elements, where the service-processed fourth packet carries at least two service chain identifiers; the processor is further configured to: when one of the at least two service chain identifiers carried in the service-processed fourth packet matches the first service chain identifier in the first service chain forwarding rule, determine, according to the first identifier, that the service-processed fourth packet is to be sent to the first access network element; and the transmitter is further configured to: forward the service-processed fourth packet to the first access network element.

With reference to the fourth implementation of the first aspect, in a fifth implementation of the first aspect, the service-processed fourth packet carries a result of the service processing performed by the one or more service processing network elements, so that the first access network element forwards the packet according to the result.

With reference to any one of the first aspect or the first to the fifth implementations of the first aspect, in a sixth implementation of the first aspect, the receiver is further configured to: receive a fifth service chain forwarding rule sent by the controller according to a terminal idle state notification, where the fifth service chain forwarding rule includes the first service chain identifier and identifiers of one or more access network elements, the one or more access network elements are access network elements in a paging group to which the terminal belongs, and the first service chain identifier corresponds to the identifiers of the one or more access network elements; and receive a fifth packet sent by the classifier, where the fifth packet carries a service chain identifier; the processor is further configured to: when the service chain identifier carried in the fifth packet matches the first service chain identifier in the fifth service chain forwarding rule, determine, according to the identifiers of the one or more access network elements, that the fifth packet is to be sent to the one or more access network elements; and the transmitter is further configured to: forward the fifth packet to the one or more access network elements, to trigger the one or more access network elements to page the terminal.

With reference to the sixth implementation of the first aspect, in a seventh implementation of the first aspect, the transmitter is configured to: send the fifth packet to the one or more access network elements in a specified order, until one of the one or more access network elements pages the terminal successfully or the one or more access network elements all fail to page the terminal.

With reference to any one of the first aspect or the first to the seventh implementations of the first aspect, in an eighth implementation of the first aspect, the first service chain forwarding rule further includes an identifier of at least one service processing network element corresponding to the first service chain identifier; the processor is configured to: when the service chain identifier carried in the first packet matches the first service chain identifier in the first service chain forwarding rule, determine, according to the identifier of the at least one service processing network element, that the first packet is to be sent to the service processing network element corresponding to the identifier of the at least one service processing network element; the transmitter is further configured to: forward the first packet to the service processing network element corresponding to the identifier of the at least one service processing network element, for service processing; the receiver is further configured to: receive the service-processed first packet sent by the service processing network element corresponding to the identifier of the at least one service processing network element; the processor is further configured to: determine, according to the first identifier of the first access network element, that the service-processed first packet is to be sent to the first access network element; and the transmitter is further configured to: forward the service-processed first packet to the first access network element.

With reference to any one of the first aspect or the first to the eighth implementations of the first aspect, in a ninth implementation of the first aspect, the processor is further configured to: before the transmitter forwards a to-be-forwarded packet to a next network element, if the next network element is an access network element, remove a service chain identifier carried in the to-be-forwarded packet, or if the next network element is not an access network element, reserve a service chain identifier carried in the to-be-forwarded packet; where the to-be-forwarded packet is the first packet or the service-processed first packet.

With reference to any one of the first aspect or the first to the ninth implementations of the first aspect, in a tenth implementation of the first aspect, the first service chain forwarding rule is sent by the controller according to a second terminal access request and a third terminal access request, the second terminal access request is initiated by the terminal through the first access network element, the third terminal access request is initiated by the terminal through the second access network element, the first service chain forwarding rule further includes the second identifier of the second access network element, and the second identifier of the second access network element corresponds to the first service chain identifier; the processor is configured to: select the first access network element from the first access network element and the second access network element based on load balance according to the first identifier and the second identifier; and the transmitter is configured to: forward the first packet to the first access network element selected by the processor.

With reference to any one of the first aspect or the first to the tenth implementations of the first aspect, in an eleventh implementation of the first aspect, the first service chain forwarding rule is sent by the controller according to a second terminal access request and a third terminal access request, the second terminal access request is initiated by the terminal through the first access network element, the third terminal access request is initiated by the terminal through the second access network element, the first service chain forwarding rule further includes the second identifier of the second access network element, and the second identifier of the second access network element corresponds to the first service chain identifier; the processor is configured to: determine, according to the first identifier and the second identifier, that the first packet is to be sent to the first access network element and the second access network element; and the transmitter is configured to: forward the first packet to the first access network element and the second access network element.

According to a second aspect, an access control apparatus is provided. The apparatus includes a processor, configured to generate a first service chain classification rule and a first service chain forwarding rule, where the first service chain classification rule includes a forwarding identifier allocated to a terminal and a first service chain identifier corresponding to the terminal, the forwarding identifier corresponds to the first service chain identifier, the first service chain forwarding rule includes at least the first service chain identifier and a first identifier of a first access network element, and the first service chain identifier corresponds to the first identifier. The apparatus also includes a transmitter, configured to send the first service chain classification rule to a classifier, where the first service chain classification rule is used by the classifier to encapsulate the first service chain identifier into a received first packet including the forwarding identifier; send the first service chain forwarding rule to a forwarder, where the first service chain forwarding rule is used by the forwarder to forward the received first packet including the first service chain identifier to the first access network element.

With reference to the second aspect, in a first implementation of the second aspect, the apparatus further includes: a receiver, configured to receive a first terminal access request sent by the first access network element; and the processor is configured to: after the receiver receives the first terminal access request, generate the first service chain classification rule and the first service chain forwarding rule.

With reference to the first implementation of the second aspect, in a second implementation of the second aspect, the receiver is further configured to receive a first terminal handover request; the processor is further configured to: after the receiver receives the first terminal handover request, generate a second service chain forwarding rule, where the second service chain forwarding rule includes the first service chain identifier and a second identifier of a second access network element, the second access network element is an access network element to which the terminal is handed over, and the first service chain identifier corresponds to the second identifier; and the transmitter is further configured to: send the second service chain forwarding rule to the forwarder, where the second service chain forwarding rule is used by the forwarder to forward a received second packet including the first service chain identifier to the second access network element.

With reference to the first implementation of the second aspect, in a third implementation of the second aspect, the receiver is further configured to receive a second terminal handover request; the processor is further configured to: after the receiver receives the second terminal handover request, generate a third service chain forwarding rule, where the third service chain forwarding rule includes the first service chain identifier, the first identifier of the first access network element, and a second identifier of a second access network element, the second access network element is an access network element to which the terminal is handed over, and the first service chain identifier corresponds to the first identifier and the second identifier; and the transmitter is further configured to: send the third service chain forwarding rule to the forwarder, where the third service chain forwarding rule is used by the forwarder to forward a received third packet including the first service chain identifier to the first access network element and the second access network element.

With reference to any one of the first to the third implementations of the second aspect, in a fourth implementation of the second aspect, the receiver is further configured to receive a terminal service setup request; the processor is further configured to: after the receiver receives the terminal service setup request, generate a second service chain identifier corresponding to a requested service, and generate a second service chain classification rule and a fourth service chain forwarding rule, where the second service chain classification rule includes the forwarding identifier of the terminal and the second service chain identifier, the forwarding identifier corresponds to the second service chain identifier, the fourth service chain forwarding rule includes the second service chain identifier and identifiers of one or more service processing network elements for processing the service, and the second service chain identifier corresponds to the identifiers of the one or more service processing network elements; and the transmitter is further configured to: send the second service chain classification rule to the classifier, where the second service chain classification rule is used by the classifier to encapsulate the second service chain identifier into a received fourth packet including the forwarding identifier; and send the fourth service chain forwarding rule to the forwarder, where the fourth service chain forwarding rule is used by the forwarder to forward the received fourth packet including the second service chain identifier to the one or more service processing network elements.

With reference to any one of the first to the fourth implementations of the second aspect, in a fifth implementation of the second aspect, the receiver is further configured to receive a terminal idle state notification; the processor is further configured to: after the receiver receives the terminal idle state notification, generate a fifth service chain forwarding rule, where the fifth service chain forwarding rule includes the first service chain identifier and identifiers of one or more access network elements, the one or more access network elements are access network elements in a paging group to which the terminal belongs, and the first service chain identifier corresponds to the identifiers of the one or more access network elements; and the transmitter is further configured to: send the fifth service chain forwarding rule to the forwarder, where the fifth service chain forwarding rule is used by the forwarder to forward a received fifth packet including the first service chain identifier to the one or more access network elements.

With reference to the fifth implementation of the second aspect, in a sixth implementation of the second aspect, the fifth service chain forwarding rule further includes a preset policy, so that the forwarder forwards, according to the preset policy, the received fifth packet including the first service chain identifier to the one or more access network elements.

With reference to any one of the first to the sixth implementations of the second aspect, in a seventh implementation of the second aspect, the processor is further configured to: generate a third service chain classification rule, where the third service chain classification rule includes the forwarding identifier of the terminal, the first service chain identifier, and a paging parameter, and the forwarding identifier corresponds to the first service chain identifier and the paging parameter; and the transmitter is further configured to: send the third service chain classification rule to the classifier, where the third service chain classification rule is used by the classifier to encapsulate the first service chain identifier and the paging parameter into the received fifth packet including the forwarding identifier.

With reference to the seventh implementation of the second aspect, in an eighth implementation of the second aspect, the receiver is further configured to receive an indication indicating that the terminal exits an idle state and sent by the terminal after the terminal is successfully paged; the processor is further configured to: after the receiver receives the indication indicating that the terminal exits the idle state, generate a fourth service chain classification rule, where the fourth service chain classification rule includes the forwarding identifier of the terminal and the first service chain identifier, and the forwarding identifier corresponds to the first service chain identifier; and the transmitter is further configured to: send the fourth service chain classification rule to the classifier, where the fourth service chain classification rule is used by the classifier to encapsulate the first service chain identifier into a received sixth packet including the forwarding identifier.

With reference to any one of the first to the eighth implementations of the second aspect, in a ninth implementation of the second aspect, the receiver is further configured to receive a second terminal access request sent by the first access network element and a third terminal access request sent by the second access network element; and the processor is further configured to: after the receiver receives the second terminal access request and the third terminal access request, generate the first service chain classification rule and the first service chain forwarding rule; where the forwarding identifier in the first service chain classification rule includes a first forwarding identifier allocated to the terminal according to the second terminal access request, or a second forwarding identifier allocated to the terminal according to the third terminal access request; and the first service chain forwarding rule further includes the second identifier of the second access network element, and the first service chain identifier further corresponds to the second identifier.

With reference to any one of the second aspect or the first to the ninth implementations of the second aspect, in a tenth implementation of the second aspect, the first service chain forwarding rule further includes an identifier of at least one service processing network element, so that the forwarder first forwards the first packet to the at least one service processing network element for service processing and then forwards the service-processed first packet to the first access network element.

According to a third aspect, an access control system is provided, where the system includes a controller, a classifier, a forwarder, and an access network element, where the controller includes the apparatus according to the second aspect, and the forwarder includes the apparatus according to the first aspect. The classifier is configured to receive the first service chain classification rule sent by the controller, and when receiving a first packet including a forwarding identifier of the terminal, encapsulate the first service chain identifier in the first service chain classification rule into the first packet. The access network element is configured to receive the first packet sent by the forwarder, and forward the first packet to the terminal.

With reference to the third aspect, in a first implementation of the third aspect, the controller is further configured to: after receiving a terminal idle state notification, generate a second service chain classification rule, where the second service chain classification rule includes the forwarding identifier of the terminal, the first service chain identifier, and a paging parameter, and the forwarding identifier corresponds to the first service chain identifier and the paging parameter; and send the second service chain classification rule to the classifier; and the classifier is further configured to: receive the second service chain classification rule sent by the controller, and when receiving a second packet including the forwarding identifier of the terminal, encapsulate the first service chain identifier and the paging parameter into the second packet.

With reference to the first implementation of the third aspect, in a second implementation of the third aspect, the controller is further configured to: after an indication indicating that the terminal exits an idle state and sent by the terminal after the terminal is successfully paged is received, generate a third service chain classification rule, where the third service chain classification rule includes the forwarding identifier of the terminal and the first service chain identifier, and the forwarding identifier corresponds to the first service chain identifier; and send the third service chain classification rule to the classifier; and the classifier is further configured to: receive the third service chain classification rule sent by the controller, and when receiving a third packet including the forwarding identifier of the terminal, encapsulate the first service chain identifier into the third packet.

With reference to the third aspect, in a third implementation of the third aspect, the system further includes: at least one service processing network element, configured to: receive a packet sent by the forwarder, perform service processing on the received packet, and send the service-processed packet to the forwarder; and the first service chain forwarding rule generated by the controller further includes an identifier of the at least one service processing network element.

With reference to the third aspect, in a fourth implementation of the third aspect, the access network element is further configured to: receive a packet of the terminal, encapsulate access information into the packet of the terminal, and forward the packet carrying the access information to the classifier.

According to a fourth aspect, an access control method is provided. The method includes receiving a first service chain forwarding rule sent by a controller, where the first service chain forwarding rule includes a first service chain identifier corresponding to a terminal, and a first identifier of a first access network element, and the first identifier corresponds to the first service chain identifier. The method also includes receiving a first packet sent by a classifier, where the first packet carries a service chain identifier. The method also includes, when the service chain identifier carried in the first packet matches the first service chain identifier in the first service chain forwarding rule, forwarding the first packet to the first access network element according to the first identifier of the first access network element.

With reference to the fourth aspect, in a first implementation of the fourth aspect, the first service chain forwarding rule is sent by the controller according to a first terminal access request, and the first terminal access request is initiated by the terminal through the first access network element.

With reference to the fourth aspect or the first implementation of the fourth aspect, in a second implementation of the fourth aspect, the method further includes: receiving a second service chain forwarding rule sent by the controller according to a terminal handover request, where the second service chain forwarding rule includes the first service chain identifier and a second identifier of a second access network element, the second access network element is an access network element to which the terminal is handed over, and the second identifier corresponds to the first service chain identifier; receiving a second packet sent by the classifier, where the second packet carries a service chain identifier; and when the service chain identifier carried in the second packet matches the first service chain identifier in the second service chain forwarding rule, forwarding the second packet to the second access network element according to the second identifier of the second access network element.

With reference to the fourth aspect or the first implementation of the fourth aspect, in a third implementation of the fourth aspect, the method further includes: receiving a third service chain forwarding rule sent by the controller according to a terminal handover request, where the third service chain forwarding rule includes the first service chain identifier, the first identifier of the first access network element, and a second identifier of a second access network element, the second access network element is an access network element to which the terminal is handed over, and the first service chain identifier corresponds to the first identifier and the second identifier; receiving a third packet sent by the classifier, where the third packet carries a service chain identifier; and when the service chain identifier carried in the third packet matches the first service chain identifier in the third service chain forwarding rule, forwarding the third packet to the first access network element and the second access network element according to the first identifier and the second identifier.

With reference to any one of the fourth aspect or the first to the third implementations of the fourth aspect, in a fourth implementation of the fourth aspect, the method further includes: receiving a fourth service chain forwarding rule sent by the controller according to a terminal service setup request, where the fourth service chain forwarding rule includes a second service chain identifier corresponding to a service of the terminal, and identifiers of one or more service processing network elements, the one or more service processing network elements are network elements for processing the service, and the second service chain identifier corresponds to the identifiers of the one or more service processing network elements; receiving a fourth packet sent by the classifier, where the fourth packet carries at least two service chain identifiers; when one of the at least two service chain identifiers carried in the fourth packet matches the second service chain identifier in the fourth service chain forwarding rule, forwarding the fourth packet to the one or more service processing network elements according to the identifiers of the one or more service processing network elements, for service processing; receiving the service-processed fourth packet sent by the one or more service processing network elements; and when one of the at least two service chain identifiers carried in the service-processed fourth packet matches the first service chain identifier in the first service chain forwarding rule, forwarding the service-processed fourth packet to the first access network element according to the first identifier.

With reference to the fourth implementation of the fourth aspect, in a fifth implementation of the fourth aspect, the service-processed fourth packet carries a result of the service processing performed by the one or more service processing network elements, so that the first access network element forwards the packet according to the result.

With reference to any one of the fourth aspect or the first to the fifth implementations of the fourth aspect, in a sixth implementation of the fourth aspect, the method further includes: receiving a fifth service chain forwarding rule sent by the controller according to a terminal idle state notification, where the fifth service chain forwarding rule includes the first service chain identifier and identifiers of one or more access network elements, the one or more access network elements are access network elements in a paging group to which the terminal belongs, and the first service chain identifier corresponds to the identifiers of the one or more access network elements; receiving a fifth packet sent by the classifier, where the fifth packet carries a service chain identifier; and when the service chain identifier carried in the fifth packet matches the first service chain identifier in the fifth service chain forwarding rule, forwarding the fifth packet to the one or more access network elements according to the identifiers of the one or more access network elements, to trigger the one or more access network elements to page the terminal.

With reference to the sixth implementation of the fourth aspect, in a seventh implementation of the fourth aspect, the forwarding the fifth packet to the one or more access network elements, to trigger the one or more access network elements to page the terminal includes: sending the fifth packet to the one or more access network elements in a specified order, until one of the one or more access network elements pages the terminal successfully or the one or more access network elements all fail to page the terminal.

With reference to any one of the fourth aspect or the first to the seventh implementations of the fourth aspect, in an eighth implementation of the fourth aspect, the first service chain forwarding rule further includes an identifier of at least one service processing network element corresponding to the first service chain identifier; and the forwarding the first packet to the first access network element according to the first identifier of the first access network element when the service chain identifier carried in the first packet matches the first service chain identifier in the first service chain forwarding rule includes: when the service chain identifier carried in the first packet matches the first service chain identifier in the first service chain forwarding rule, forwarding, according to the identifier of the at least one service processing network element, the first packet to the service processing network element corresponding to the identifier of the at least one service processing network element, for service processing; receiving the service-processed first packet sent by the service processing network element corresponding to the identifier of the at least one service processing network element; and forwarding the service-processed first packet to the first access network element according to the first identifier of the first access network element.

With reference to any one of the fourth aspect or the first to the eighth implementations of the fourth aspect, in a ninth implementation of the fourth aspect, the method further includes: before forwarding a to-be-forwarded packet to a next network element, if the next network element is an access network element, removing a service chain identifier carried in the to-be-forwarded packet, or if the next network element is not an access network element, reserving a service chain identifier carried in the to-be-forwarded packet; where the to-be-forwarded packet is the first packet or the service-processed first packet.

With reference to any one of the fourth aspect or the first to the ninth implementations of the fourth aspect, in a tenth implementation of the fourth aspect, the first service chain forwarding rule is sent by the controller according to a second terminal access request and a third terminal access request, the second terminal access request is initiated by the terminal through the first access network element, the third terminal access request is initiated by the terminal through the second access network element, the first service chain forwarding rule further includes the second identifier of the second access network element, and the second identifier of the second access network element corresponds to the first service chain identifier; and the forwarding the first packet to the first access network element according to the first identifier of the first access network element includes: selecting the first access network element from the first access network element and the second access network element based on load balance according to the first identifier and the second identifier, and forwarding the first packet to the first access network element.

With reference to any one of the fourth aspect or the first to the tenth implementations of the fourth aspect, in an eleventh implementation of the fourth aspect, the first service chain forwarding rule is sent by the controller according to a second terminal access request and a third terminal access request, the second terminal access request is initiated by the terminal through the first access network element, the third terminal access request is initiated by the terminal through the second access network element, the first service chain forwarding rule further includes the second identifier of the second access network element, and the second identifier of the second access network element corresponds to the first service chain identifier; and the forwarding the first packet to the first access network element according to the first identifier of the first access network element includes: forwarding the first packet to the first access network element and the second access network element according to the first identifier and the second identifier.

According to a fifth aspect, an access control method is provided. The method includes generating a first service chain classification rule and a first service chain forwarding rule, where the first service chain classification rule includes a forwarding identifier allocated to a terminal and a first service chain identifier corresponding to the terminal, the forwarding identifier corresponds to the first service chain identifier, the first service chain forwarding rule includes at least the first service chain identifier and a first identifier of a first access network element, and the first service chain identifier corresponds to the first identifier. The method also includes sending the first service chain classification rule to a classifier, where the first service chain classification rule is used by the classifier to encapsulate the first service chain identifier into a received first packet including the forwarding identifier. The method also includes sending the first service chain forwarding rule to a forwarder, where the first service chain forwarding rule is used by the forwarder to forward the received first packet including the first service chain identifier to the first access network element.

With reference to the fifth aspect, in a first implementation of the fifth aspect, the generating a first service chain classification rule and a first service chain forwarding rule includes: after receiving a first terminal access request sent by the first access network element, generating the first service chain classification rule and the first service chain forwarding rule.

With reference to the fifth aspect or the first implementation of the fifth aspect, in a second implementation of the fifth aspect, the method further includes: after receiving a first terminal handover request, generating a second service chain forwarding rule, where the second service chain forwarding rule includes the first service chain identifier and a second identifier of a second access network element, the second access network element is an access network element to which the terminal is handed over, and the first service chain identifier corresponds to the second identifier; and sending the second service chain forwarding rule to the forwarder, where the second service chain forwarding rule is used by the forwarder to forward a received second packet including the first service chain identifier to the second access network element.

With reference to the first or the second implementation of the fifth aspect, in a third implementation of the fifth aspect, the method further includes: after receiving a second terminal handover request, generating a third service chain forwarding rule, where the third service chain forwarding rule includes the first service chain identifier, the first identifier of the first access network element, and a second identifier of a second access network element, the second access network element is an access network element to which the terminal is handed over, and the first service chain identifier corresponds to the first identifier and the second identifier; and sending the third service chain forwarding rule to the forwarder, where the third service chain forwarding rule is used by the forwarder to forward a received third packet including the first service chain identifier to the first access network element and the second access network element.

With reference to any one of the fifth aspect or the first to the third implementations of the fifth aspect, in a fourth implementation of the fifth aspect, the method further includes: after receiving a terminal service setup request, generating a second service chain identifier corresponding to a requested service, and generating a second service chain classification rule and a fourth service chain forwarding rule, where the second service chain classification rule includes the forwarding identifier of the terminal and the second service chain identifier, the forwarding identifier corresponds to the second service chain identifier, the fourth service chain forwarding rule includes the second service chain identifier and identifiers of one or more service processing network elements for processing the service, and the second service chain identifier corresponds to the identifiers of the one or more service processing network elements; sending the second service chain classification rule to the classifier, where the second service chain classification rule is used by the classifier to encapsulate the second service chain identifier into a received fourth packet including the forwarding identifier; and sending the fourth service chain forwarding rule to the forwarder, where the fourth service chain forwarding rule is used by the forwarder to forward the received fourth packet including the second service chain identifier to the one or more service processing network elements.

With reference to any one of the fifth aspect or the first to the fourth implementations of the fifth aspect, in a fifth implementation of the fifth aspect, the method further includes: after receiving a terminal idle state notification, generating a fifth service chain forwarding rule, where the fifth service chain forwarding rule includes the first service chain identifier and identifiers of one or more access network elements, the one or more access network elements are access network elements in a paging group to which the terminal belongs, and the first service chain identifier corresponds to the identifiers of the one or more access network elements; and sending the fifth service chain forwarding rule to the forwarder, where the fifth service chain forwarding rule is used by the forwarder to forward a received fifth packet including the first service chain identifier to the one or more access network elements.

With reference to the fifth implementation of the fifth aspect, in a sixth implementation of the fifth aspect, the fifth service chain forwarding rule further includes a preset policy, so that the forwarder forwards, according to the preset policy, the received fifth packet including the first service chain identifier to the one or more access network elements.

With reference to any one of the fifth aspect or the first to the sixth implementations of the fifth aspect, in a seventh implementation of the fifth aspect, the method further includes: generating a third service chain classification rule, where the third service chain classification rule includes the forwarding identifier of the terminal, the first service chain identifier, and a paging parameter, and the forwarding identifier corresponds to the first service chain identifier and the paging parameter; and sending the third service chain classification rule to the classifier, where the third service chain classification rule is used by the classifier to encapsulate the first service chain identifier and the paging parameter into the received fifth packet including the forwarding identifier.

With reference to the seventh implementation of the fifth aspect, in an eighth implementation of the fifth aspect, the method further includes: after an indication indicating that the terminal exits an idle state and sent by the terminal after the terminal is successfully paged is received, generating a fourth service chain classification rule, where the fourth service chain classification rule includes the forwarding identifier of the terminal and the first service chain identifier, and the forwarding identifier corresponds to the first service chain identifier; and sending the fourth service chain classification rule to the classifier, where the fourth service chain classification rule is used by the classifier to encapsulate the first service chain identifier into a received sixth packet including the forwarding identifier.

With reference to any one of the fifth aspect or the first to the eighth implementations of the fifth aspect, in a ninth implementation of the fifth aspect, the generating a first service chain classification rule and a first service chain forwarding rule includes: after receiving a second terminal access request sent by the first access network element and a third terminal access request sent by the second access network element, generating the first service chain classification rule and the first service chain forwarding rule; where the forwarding identifier in the first service chain classification rule includes a first forwarding identifier allocated to the terminal according to the second terminal access request, or a second forwarding identifier allocated to the terminal according to the third terminal access request; and the first service chain forwarding rule further includes the second identifier of the second access network element, and the first service chain identifier further corresponds to the second identifier.

With reference to any one of the fifth aspect or the first to the ninth implementations of the fifth aspect, in a tenth implementation of the fifth aspect, the first service chain forwarding rule further includes an identifier of at least one service processing network element, so that the forwarder first forwards the first packet to the at least one service processing network element for service processing and then forwards the service-processed first packet to the first access network element.

The technical solutions provided by the embodiments of the present invention have the following beneficial effects.

A first service chain forwarding rule sent by a controller and a first packet sent by a classifier are received, and when a service chain identifier carried in the first packet matches a first service chain identifier in the first service chain forwarding rule, the first packet is forwarded to a first access network element according to a first identifier. In this process, the first access network element is used as a hop in service chain forwarding, unified control is performed by using a service chaining mechanism, and SDN-mechanism-based control is implemented on an access network element. In addition, based on a unified forwarding control mode on a control plane, forwarding control can be implemented on an access network and a service processing network. Therefore, service-chaining-based SDN access management and mobility management are implemented in a mobile network.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
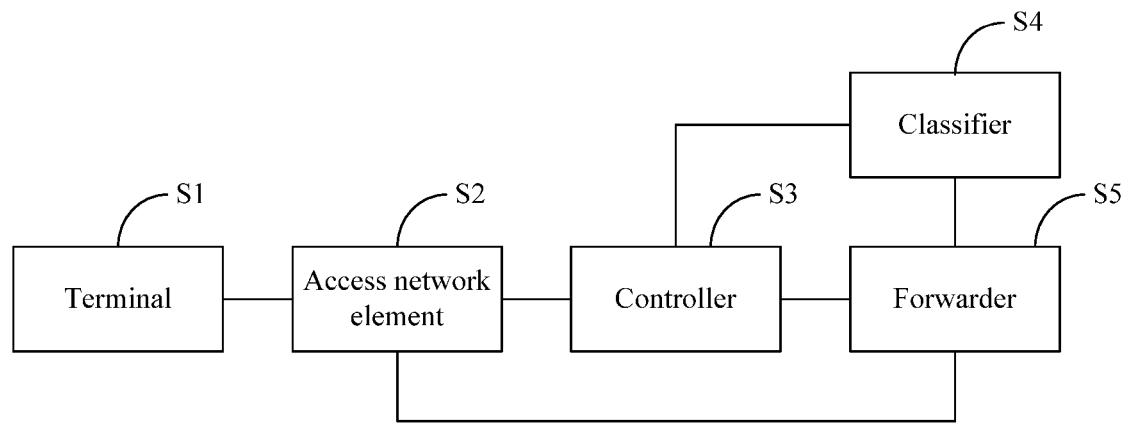
FIG. 1 is a schematic diagram of a network architecture according to an embodiment of the present invention.

The embodiments of the present invention relate to an access control apparatus, system, and method, to implement SDN-mechanism-based control on an access network element in a mobile network. The embodiments are applicable to a network architecture shown in FIG. 1. Referring to FIG. 1, the network architecture includes a terminal S1, an access network element S2, a controller S3, a classifier S4, and a forwarder S5. The terminal S1 includes but is not limited to: a mobile station (MS for short), a mobile terminal, a user terminal (UT for short), a user device (UD for short), or user equipment (UE for short). The access network element S2 directly interacts with the terminal S1. The access network element S2 includes but is not limited to: a radio base station, a home NodeB, an evolved NodeB (eNodeB for short), a base station (BS for short), an access point (AP for short), a Wireless Fidelity (Wi-Fi for short), or a digital subscriber line access multiplexer (DSLAM for short). The controller S3 is a device responsible for performing network-wide access and mobility management in a mobile network, and may include one or more physical devices in a specific implementation. This is not specifically limited in this embodiment. The forwarder S5 is a device responsible for packet forwarding, may directly interact with the access network element S2, and may include one or more physical devices in a specific implementation. This is not specifically limited in this embodiment. When the forwarder S5 includes multiple physical devices, sending a service chain forwarding rule by the controller S3 to the forwarder S5 may be sending the service chain forwarding rule to the multiple physical devices separately. This is not particularly stated hereinafter. The classifier S4 is responsible for performing service chain classification on a packet and encapsulating a corresponding service chain identifier. In a specific implementation, the classifier may be a separate physical device, or may be integrated with the forwarder S5 into one physical device. This is not specifically limited in this embodiment.

Figure 2:
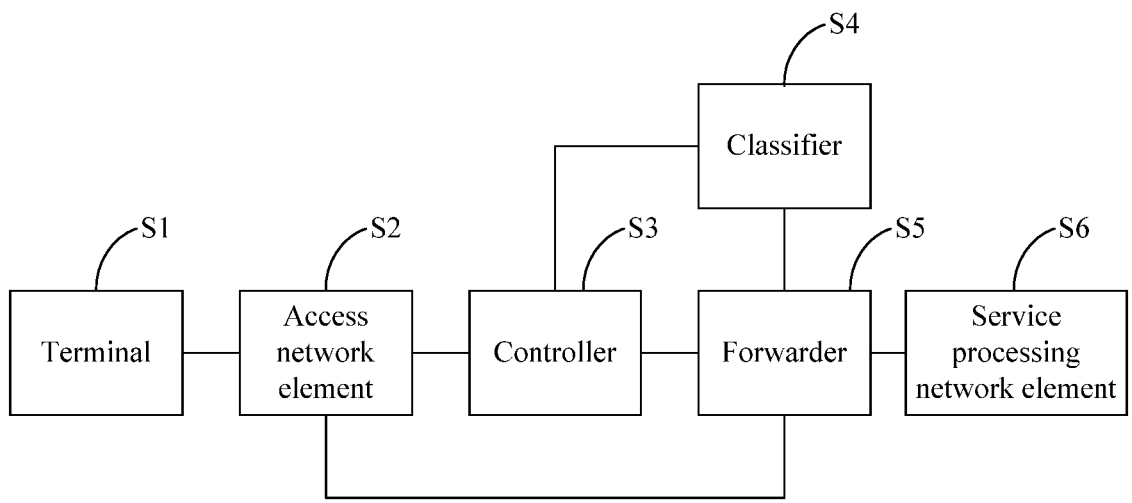
FIG. 2 is a schematic diagram of a network architecture according to another embodiment of the present invention.

Further, the network architecture may include a service processing network element. Referring to FIG. 2, a service processing network element S6 is added to the network architecture on a basis of FIG. 1. The service processing network element S6 is responsible for processing a service of the terminal. The service processing network element S6 includes but is not limited to a service function (SF for short) entity, and may be specifically a deep packet inspection (DPI for short) device, an antivirus gateway, a charging gateway, a video optimizer, a service stream compressor, a data cache, a Hypertext Transfer Protocol (HTTP for short) header enhancer, or the like.

In this embodiment of the present invention, the controller sends a service chain classification rule to the classifier and sends a service chain forwarding rule to the forwarder, so as to implement control on the access network element in the mobile network. The service chain classification rule includes a forwarding identifier of the terminal and a service chain identifier (CID for short). The service chain forwarding rule includes the service chain identifier and an identifier of the access network element. The forwarding identifier of the terminal includes but is not limited to: an Internet Protocol (IP for short) version 4 IPv4 address, an Internet Protocol version 6 IPv6 address, or a Generic Routing Encapsulation (GRE for short) or GPRS Tunneling Protocol (GTP for short) tunnel identifier of the terminal. The identifier of the access network element includes but is not limited to: an IPv4 address, an IPv6 address, or a media access control (MAC for short) address of the access network element, or a number of a port that may be connected to the access network element.

In addition, a result of packet processing by the service processing network element, for example, a video stream bit rate obtained after a video codec performs packet processing, may be further encapsulated into a packet for forwarding. The forwarder may forward the packet carrying the processing result to the access network element, so that information sharing among multiple network elements is implemented.

In the apparatus, system, and method, an SDN service routing mode is used to implement SDN-mechanism-based control on a session after a terminal accesses a mobile network. A unified SDN mechanism is used to control service packets in the mobile network. A packet is forwarded to an access network element according to an access network element identifier corresponding to a service chain identifier. No tunnel identifier needs to be used for routing the packet forwarded to the access network element. Therefore, devices on a forwarding plane in the mobile network are simplified, and their functions are unified.

To better describe an SDN-mechanism-based control procedure, using a downlink packet destined for a terminal as an example for description, the following embodiments describe in detail how to control forwarding of the packet to an access network element by using a controller, a forwarder, and a classifier, and finally implement forwarding of the downlink packet to the terminal. Certainly, in an uplink packet forwarding procedure of the terminal, a packet sent by the access network element may also be controlled and forwarded by using the controller, the forwarder, and the classifier. In this case, the classifier may be deployed on the access network element or a routing path of the access network element. After the uplink packet is classified, the packet is sent to the forwarder for forwarding under SDN-mechanism-based control. An implementation thereof is similar to the following processing of a downlink packet. Details are not described excessively herein. It should be noted that, in the uplink packet forwarding process, the access network element may also encapsulate access related information such as air interface bandwidth and congestion information into the packet for forwarding to a subsequent service processing network element, so that the service processing network element performs service processing according to the access related information. Therefore, information sharing among multiple network elements in the uplink packet forwarding process is implemented.

In a specific implementation of the embodiments of the present invention, the controller may be an independent network element, or may be a function set including multiple physical or logical entities. For example, functions of a mobility management entity (MME for short), a serving gateway (S-GW for short), a packet data network gateway (PDN Gateway, P-GW for short), and the like in an existing 3 GPP network, and functions of an SDN controller may be combined to form the controller in the present invention. A terminal access control message received by the controller, for example, an access request message, a handover request message, or an idle state request message, may be directly sent by the access network element to the controller, or a message or some parameters of a message may be forwarded to the controller by using other network elements or modules. The foregoing deployment and message forwarding modes do not affect the technical implementation of each embodiment of the present invention, and are not limited in the present invention.

Figure 3:
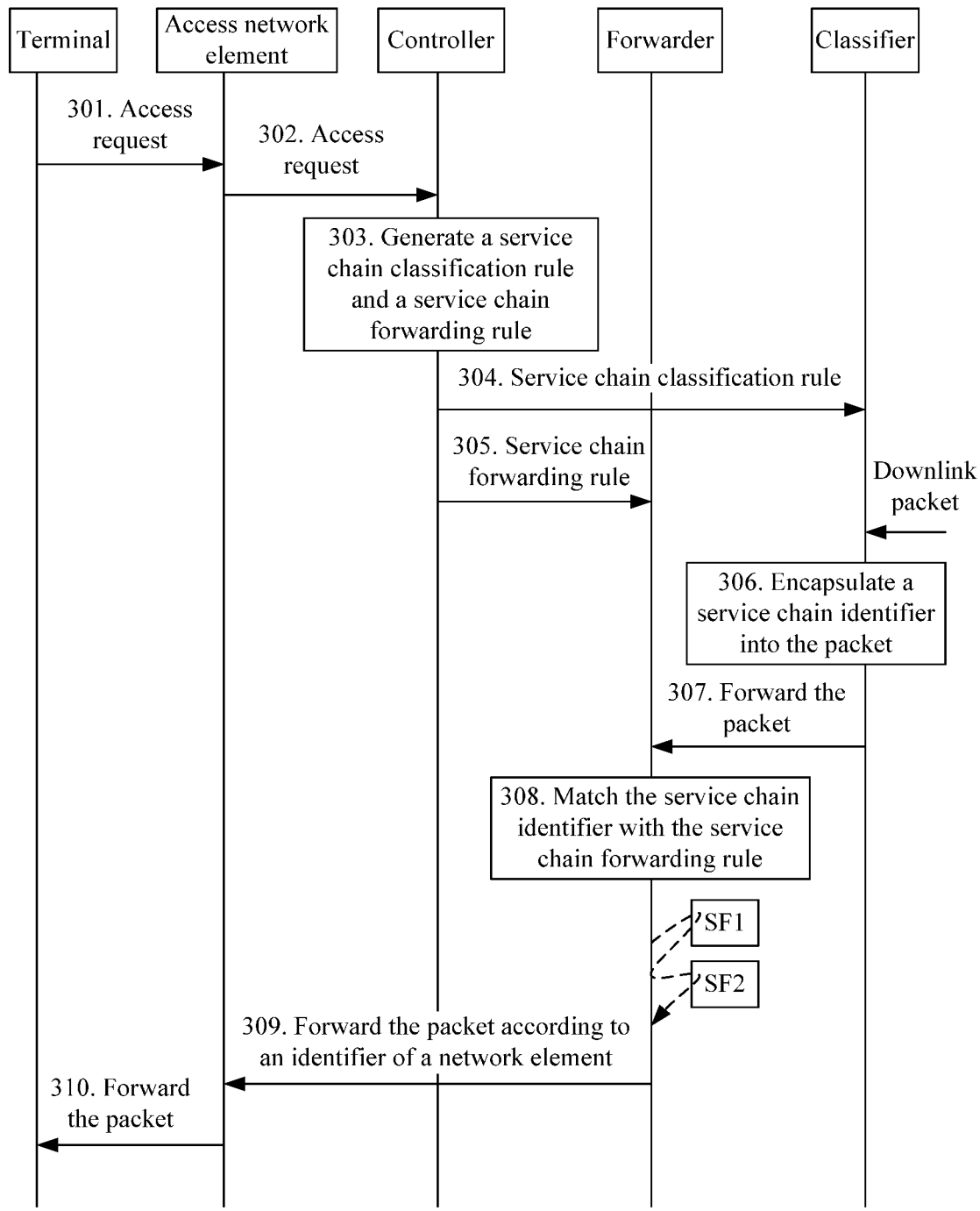
FIG. 3 is an interaction diagram of a terminal access scenario according to another embodiment of the present invention.

Referring to FIG. 3, an embodiment of the present invention provides an access control method, applied to a scenario in which a terminal requests access. The method includes the following steps.

301. A terminal initiates an access request to an access network element.

The access network element is an access device, such as a radio base station, a home NodeB, an eNodeB, a BS, an AP, a WiFi, or a DSLAM, providing access for the terminal. The access request is used to request to access a network in which the access network element is located.

302. After receiving the access request of the terminal, the access network element initiates an access request to a controller, where the access request carries an identity of the terminal or an identity of a user using the terminal.

The identity of the terminal includes but is not limited to an international mobile equipment identity (IMEI for short). The identity of the user includes but is not limited to an international mobile subscriber identity (IMSI for short).

303. After receiving the access request sent by the access network element, the controller allocates a forwarding identifier to the terminal, determines a service chain identifier, and generates a service chain classification rule and a service chain forwarding rule.

The service chain classification rule includes the forwarding identifier of the terminal and the corresponding service chain identifier. One service chain identifier may correspond to one forwarding identifier of the terminal alone, or may correspond to a combination of multiple forwarding identifiers of the terminal. This is not limited herein.

The service chain forwarding rule includes the service chain identifier and a corresponding network element identifier. The network element identifier may be an identifier of a network element, or may be identifiers of multiple network elements. In this embodiment, at least the identifier of the foregoing access network element is included. Further, an identifier of another network element may be included. For example, the another network element may be a service processing network element. The identifier of the network element may be obtained by the controller in advance. For example, the identifier of the access network element is obtained from an access request message sent by the access network element. Details are not described excessively herein.

The forwarding identifier of the terminal may be an IPv4 address, an IPv6 address, a source/destination IP address of a service stream of the terminal, a source/destination port number, a tunnel identifier, or the like. The service chain identifier may be a new service chain identifier separately generated by the controller for the terminal, or may be a service chain identifier that is generated previously and reused. This is not specifically limited in this embodiment. The network element identifier may be an IP address, a MAC address, a number of a connected port, or the like, and is not limited herein.

For example, the service chain classification rule is as follows:

Dst_IP=IP1, ChainID=CID1;

where Dst_IP indicates a destination IP address, and ChainID indicates a service chain identifier. The service chain classification rule indicates that a corresponding service chain identifier is CID1 when a destination IP address of a packet is IP1.

The service chain forwarding rule is as follows:

ChainID=CID1; Forwarding=AF1;

where ChainID indicates the service chain identifier, and Forwarding indicates the identifier of the network element. The service chain forwarding rule indicates that a packet whose service chain identifier is CID1 is forwarded to a network element whose network element identifier is AF1 for processing, where AF1 is the identifier of the access network element.

Optionally, the service chain forwarding rule may also be as follows:

ChainID=CID1; Forwarding=SF1, SF2, AF1;

where ChainID indicates the service chain identifier, and Forwarding indicates the identifier of the network element. The service chain forwarding rule indicates that a packet whose service chain identifier is CID1 is forwarded to network elements whose network element identifiers are SF1, SF2, and AF1 in sequence for processing, where AF1 is the identifier of the access network element, and SF1 and SF2 indicate an identifier of a first service function entity and an identifier of a second service function entity respectively.

Optionally, the controller may further perform access authentication on the terminal and obtain a service policy of the terminal.

304. The controller sends the service chain classification rule to a classifier.

305. The controller sends the service chain forwarding rule to a forwarder.

The service chain forwarding rule may be implemented in different technical manners. For example, when an OpenFlow manner is used, the service chain forwarding rule may be implemented by adding a service index and by using multiple flow table rules matching the service index+Chain ID.

For example, the service chain forwarding rule is as follows:

ChainID=CID1, ServiceIndex=1; action=output:AF1-port;

where ChainID is the service chain identifier, ServiceIndex is the service index, and action is an action. According to the service chain forwarding rule, the forwarder forwards a packet to a network element whose identifier is AF1. In addition, after packet forwarding, 1 is subtracted from a value of ServiceIndex, and finally, the value is 0. If AF1 is a last hop, forwarding does not continue any longer. The service chain forwarding rule in the subsequent embodiment may also be implemented in this manner. Details are not described again.

Alternatively, the service chain forwarding rule is as follows:

ChainID=CID1, ServiceIndex=3; action=output:SF1-port;
ChainID=CID1, ServiceIndex=2; action=output:SF2-port;
ChainID=CID1, ServiceIndex=1; action=output:AF1-port;

where ChainID is the service chain identifier, ServiceIndex is the service index, and action is an action. According to the service chain forwarding rule, the forwarder forwards a packet to network elements whose identifiers are SF1, SF2, and AF1 in sequence. Every time after the packet is forwarded, 1 is subtracted from a value of ServiceIndex, and finally, the value is 0. Therefore, forwarding by multiple network elements is implemented. The service chain forwarding rule in the subsequent embodiment may also be implemented in this manner. Details are not described again.

306. The classifier receives a downlink packet to be sent to the terminal, matches a forwarding identifier in the packet with the forwarding identifier in the service chain classification rule, and if the matching succeeds, encapsulates the service chain identifier in the service chain classification rule into the packet.

In this step, that the matching succeeds means that the forwarding identifier in the packet is the same as the forwarding identifier in the service chain classification rule. If the two identifiers are different, it is considered that the matching fails.

The classifier may store multiple service chain classification rules. A different service chain identifier exists in each service chain classification rule. During matching, the forwarding identifier in the packet may be used as an index to search each service chain classification rule. If a forwarding identifier in a service chain classification rule is the same as the index, the matching succeeds, and the service chain identifier may be obtained from the matched service chain classification rule and encapsulated into the packet. In this embodiment, the service chain identifier is encapsulated into a header of the packet. Details are not described excessively herein.

307. The classifier sends the packet carrying the service chain identifier to the forwarder.

308. After receiving the packet, the forwarder matches the service chain identifier carried in the packet with the service chain identifier in the service chain forwarding rule, and if the matching succeeds, obtains a network element identifier in the service chain forwarding rule. In this embodiment, network element identifiers are identifiers of the access network element and a serving network element.

In this step, that the matching succeeds means that the service chain identifier carried in the packet is the same as the service chain identifier in the service chain forwarding rule. If the two identifiers are different, it is considered that the matching fails.

One or more network element identifiers may be obtained. In this embodiment, at least the identifier of the access network element is included, and therefore, SDN-mechanism-based control is implemented on the access network element. Optionally, when identifiers of multiple network elements are obtained, the packet is forwarded to the multiple network elements in sequence.

Optionally, the forwarder may determine, according to a type of a next-hop network element, whether the service chain identifier is carried in the forwarded packet. If the type of the next-hop network element is an SF, the forwarded packet may carry the service chain identifier. If the type of the next-hop network element is an access network element, the forwarded packet does not need to carry the service chain identifier.

309. The forwarder forwards the packet to the corresponding access network element according to the obtained identifier of the access network element.

Because the access network element is a last hop in packet processing network elements, the forwarder may first remove the service chain identifier carried in the packet, and then forward the packet to the access network element.

Optionally, if identifiers of multiple network elements are obtained, the packet is first forwarded to each SF for service processing, and then forwarded to the access network element, for example, as shown by a dashed line in the figure, sent to SF1 and SF2 for service processing and then sent to the access network element. In addition, it should be noted that, after each SF performs packet processing, a processing result may be further encapsulated into the packet in a form of metadata, and then sent to the access network element by using the forwarder. Therefore, sharing of associated information between the access network element and the service processing network element may be implemented.

310. After receiving the packet, the access network element forwards the packet to the terminal, so that the terminal receives the packet.

In the method provided by this embodiment, a controller generates a service chain forwarding rule according to an access request of a terminal, and completes forwarding of a packet to an access network element according to an access network element identifier corresponding to a service chain identifier in the service chain forwarding rule. No tunnel identifier needs to be used for routing the packet forwarded to the access network element. Therefore, SDN-mechanism-based control is implemented on the access network element in a scenario in which the terminal requests access. In this process, the access network element is used as a hop in service chain forwarding, and unified control is performed by using a service chaining mechanism. In addition, based on a unified forwarding control mode on a control plane, forwarding control can be implemented on an access network and a service processing network, and therefore, service-chaining-based SDN access management and mobility management are implemented in a mobile network.

Figure 4:
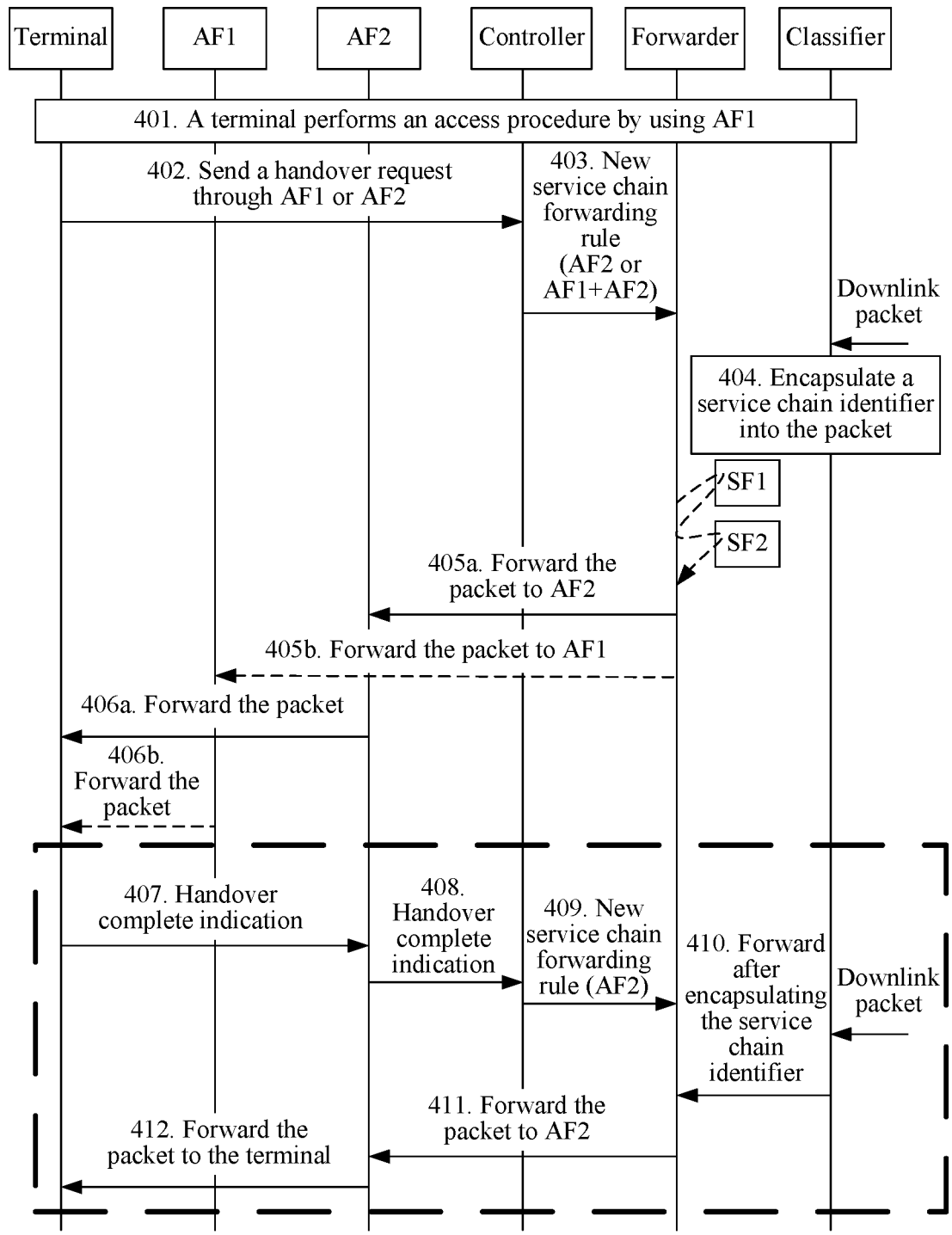
FIG. 4 is an interaction diagram of a terminal handover scenario according to another embodiment of the present invention.

Referring to FIG. 4, an embodiment of the present invention provides an access control method, applied to a terminal handover scenario. The method includes the following steps.

401. A terminal performs an access procedure by using an access network element AF1. The process is the same as the foregoing steps 301 to 310, and is not described again herein.

402. The terminal prepares for a handover from the access network element AF1 to an access network element AF2, and sends a handover request to a controller.

Optionally, the terminal may send the handover request to the controller by using AF1 or AF2.

403. After receiving the handover request, the controller generates a new service chain forwarding rule or modifies an original service chain forwarding rule to obtain a new service chain forwarding rule, and sends the new service chain forwarding rule to a forwarder for updating.

A difference between the new service chain forwarding rule and the original service chain forwarding rule lies in that, a network element identifier in the original service chain forwarding rule is an identifier of AF1, but a network element identifier in the new service chain forwarding rule is an identifier of AF2.

Generally, after receiving the new service chain forwarding rule, the forwarder replaces the original service chain forwarding rule with the new service chain forwarding rule. Details are not described herein.

Optionally, to prevent a packet loss in the handover process, AF1 and AF2 may also separately forward, in bicast mode, a packet sent to the terminal. Therefore, the network element identifier in the new service chain forwarding rule may also be the identifier of AF1 and the identifier of AF2.

404. When a classifier receives a downlink packet, the classifier classifies the packet according to a service chain classification rule, encapsulates a service chain identifier into the packet, and then forwards the packet to the forwarder.

405a. After receiving the packet, the forwarder matches the service chain identifier with the new service chain forwarding rule, and forwards the packet to the access network element AF2 according to a network element identifier in the new service chain forwarding rule.

If the network element identifier in the new service chain forwarding rule is the identifier of AF1 and the identifier of AF2, the packet is forwarded to AF1 and AF2 simultaneously in bicast mode to prevent a packet loss and improve a success ratio of packet transmission.

Optionally, if the new service chain forwarding rule further includes identifiers of other network elements, the packet is first forwarded to the other network elements in sequence, and then forwarded to the access network element. For example, as shown in the figure, according to the network element identifiers, the packet is first forwarded to SF1 and SF2 for service processing, and then forwarded to AF2 or forwarded to AF1 and AF2.

Optionally, after the foregoing step 405a, the method may further include:

405b. The forwarder forwards the packet to the access network element AF1 simultaneously according to the new service chain forwarding rule.

Before the forwarder forwards the packet to the access network element, the forwarder may first remove the service chain identifier carried in the packet and then forward the packet.

406a. After receiving the packet sent by the forwarder, AF2 sends the packet to the terminal, and completes packet transmission.

Optionally, after the foregoing step 406a, the method may further include:

406b. After receiving the packet sent by the forwarder, AF1 sends the packet to the terminal, and completes packet transmission.

When the packet is forwarded to AF1 and AF2 simultaneously in bicast mode in the foregoing step, the method may further include the following steps:

407. After completing an air interface handover, the terminal sends a handover complete indication to the access network element AF2.

408. After receiving the handover complete indication, the access network element AF2 sends the handover complete indication to the controller.

409. After receiving the handover complete indication, the controller regenerates a new service chain forwarding rule, replaces network element identifiers in the new service chain forwarding rule, namely, an identifier of AF1 and an identifier of AF2, with the identifier of AF2, and forwards the regenerated new service chain forwarding rule to the forwarder for updating.

410. When receiving a downlink packet, the classifier encapsulates the service chain identifier into the packet according to the service chain classification rule, and then forwards the packet to the forwarder.

411. After receiving the packet, the forwarder forwards the packet to AF2 according to the updated new service chain forwarding rule.

Optionally, the packet may be first sent to other packet processing network elements, and finally forwarded to AF2. Details are not described herein.

412. After receiving the packet, AF2 forwards the packet to the terminal.

In the method provided by this embodiment, after a terminal completes an access procedure, a controller generates a service chain forwarding rule according to a handover request of the terminal, and completes forwarding of a packet to an access network element according to a network element identifier corresponding to a service chain identifier in the service chain forwarding rule, where the network element identifier may be an identifier of a network element after the handover, or may be an identifier of a network element before the handover and an identifier of a network element after the handover, so that SDN-mechanism-based control is implemented on the access network element in a terminal handover scenario. In this process, the access network element is used as a hop in service chain forwarding, no tunnel identifier needs to be used for routing the packet forwarded to the access network element, and unified control is performed by using a service chaining mechanism. In addition, based on a unified forwarding control mode on a control plane, forwarding control can be implemented on an access network and a service processing network, and therefore, service-chaining-based SDN access management and mobility management are implemented in a mobile network.

Figure 5:
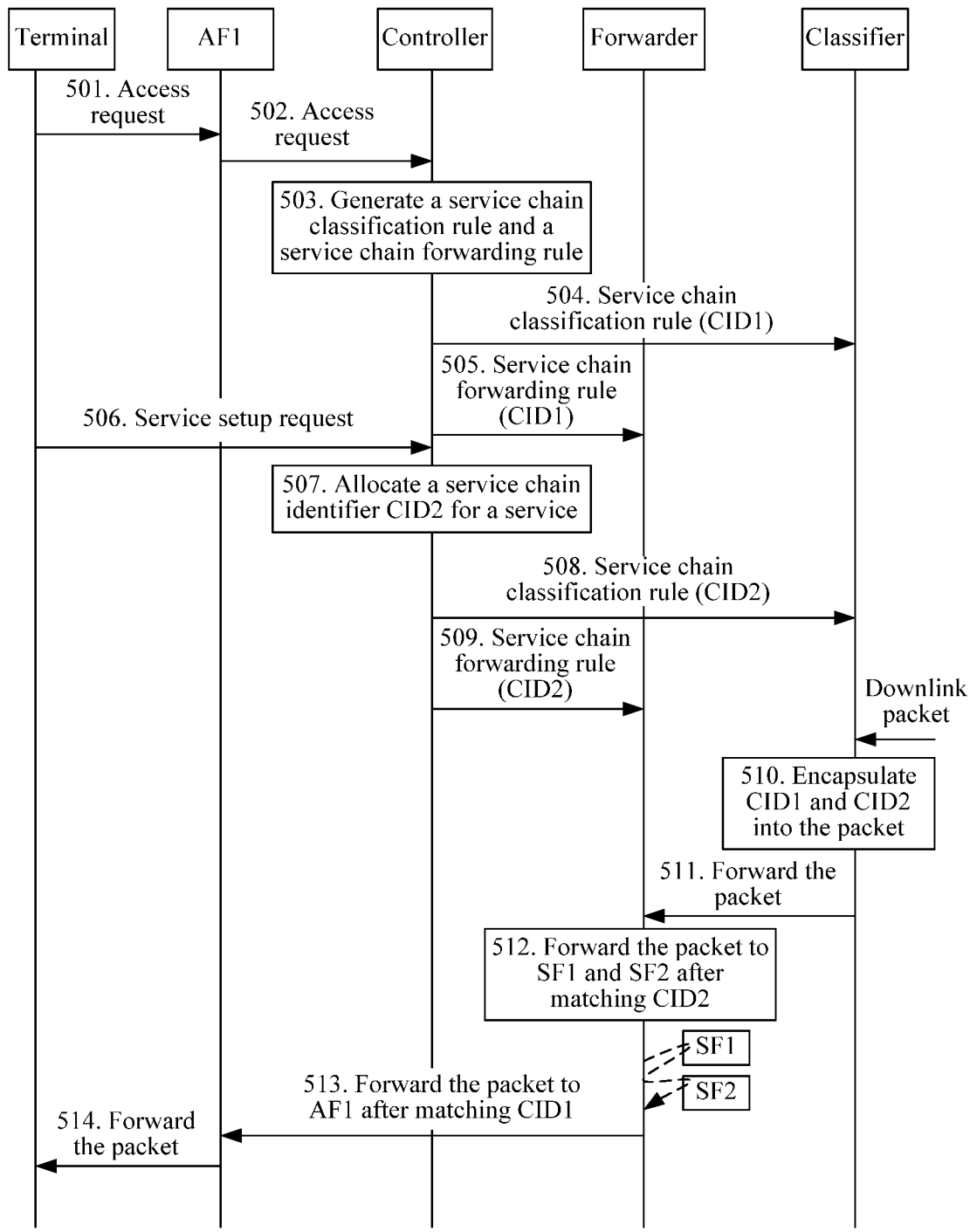
FIG. 5 is an interaction diagram of a terminal service setup scenario according to another embodiment of the present invention.

Referring to FIG. 5, an embodiment of the present invention provides an access control method, applied to a scenario in which a terminal requests to set up a service, where an access request is distinguished from a service setup request by using different service chain identifiers. The method includes the following steps.

501. A terminal initiates an access request to an access network element AF1.

502. After receiving the access request, the access network element AF1 sends the access request to a controller.

503. After receiving the access request sent by the access network element, the controller allocates a forwarding identifier to the terminal, determines a service chain identifier CID1, and generates a service chain classification rule and a service chain forwarding rule.

The service chain classification rule includes the forwarding identifier of the terminal and the corresponding service chain identifier CID1. The service chain forwarding rule includes the service chain identifier CID1 and a corresponding network element identifier, namely, an identifier of AF1.

For example, the service chain classification rule is as follows:

Dst_IP=IP1, ChainID=CID1;

where Dst_IP indicates a destination IP address, and ChainID indicates a service chain identifier. The service chain classification rule indicates that a corresponding service chain identifier is CID1 when a destination IP address of a packet is IP1.

The service chain forwarding rule is as follows:

ChainID=CID1; Forwarding=AF1;

where ChainID indicates the service chain identifier, and Forwarding indicates the identifier of the network element. The service chain forwarding rule indicates that a packet whose service chain identifier is CID1 is forwarded to the access network element AF1.

Optionally, the controller may further perform access authentication on the terminal and obtain a service policy of the terminal.

504. The controller sends the service chain classification rule to a classifier.

505. The controller sends the service chain forwarding rule to a forwarder.

506. When the terminal initiates a service, the terminal sends a service setup request to the controller, where the service setup request carries service stream information corresponding to the service.

The service requested by the terminal may be any service, for example, a VoIP service, a download service, a short message service, a multimedia message service, or a WeChat service, and is not limited herein. The service stream information includes but is not limited to an IP quintuple (a source IP address, a destination IP address, a source port number, a destination port number, and a protocol type).

507. After receiving the service setup request, the controller allocates a corresponding service chain identifier CID2 for the service, and generates a new service chain classification rule and a new service chain forwarding rule based on CID2.

The new service chain classification rule includes a service feature and the corresponding service chain identifier CID2. The service feature includes but is not limited to various types of information related to the service.

For example, the new service chain classification rule is as follows:

Src_IP=IP2, Dst_IP=IP1, Dst_Port=8080; ChainID=CID2;

where Src_IP is a source IP address, Dst_IP is a destination IP address, Dst_Port is a destination port number, and ChainID is a service chain identifier. The new service chain classification rule indicates that when a source IP address of a packet is IP2, a destination IP address is IP1, and a destination port number is 8080, a service chain identifier corresponding to the packet is CID2.

The new service chain forwarding rule is as follows:

ChainID=CID2; Forwarding=SF1, SF2;

where ChainID indicates the service chain identifier, and Forwarding indicates the identifier of the network element. The new service chain forwarding rule indicates that a packet whose service chain identifier is CID2 is forwarded to SF1 and SF2 in sequence.

In this embodiment, a priority of service processing is higher than a priority of access processing. Therefore, the controller may set a priority of the service chain CID2 determined according to the service setup request, to be higher than that of the service chain CID1 determined according to the access request, and correspondingly, set a priority of the service chain forwarding rule including CID2, to be higher than that of the service chain forwarding rule including CID1, thereby ensuring that service processing is performed on a packet before the packet is forwarded to the access network element.

508. The controller sends the new service chain classification rule to the classifier for updating.

509. The controller sends the new service chain forwarding rule to the forwarder for updating.

510. After a downlink packet to be sent to the terminal arrives at the classifier, the classifier matches a forwarding identifier in the packet with the original service chain classification rule and the new service chain classification rule separately, and if both are matched successfully, encapsulates the two service chain identifiers CID1 and CID2 into the packet.

It should be noted that, in this embodiment, an example in which the packet encapsulated by the classifier carries two service chain identifiers is used for description. In an actual application, the packet encapsulated by the classifier may also carry more service chain identifiers. A specific quantity of service chain identifiers carried in the packet is not limited in this embodiment. For example, the packet carries three service chain identifiers in total, namely, CID1, CID2, and CID3.

511. The classifier sends the packet carrying the two service chain identifiers to the forwarder.

512. The forwarder matches the service chain identifiers carried in the packet with the original service chain forwarding rule and the new service chain forwarding rule separately. If one of the service chain identifiers carried in the packet matches the original service chain forwarding rule and the other matches the new service chain forwarding rule, it indicates that both the two service chain forwarding rules are matched successfully. In this case, in descending order of priorities of service chains, the packet is first forwarded to SF1 and SF2 according to the network element identifiers corresponding to CID2.

Network element identifiers in the service chain forwarding rule are in sequence. The packet may be forwarded according to the sequence. For example, the network element identifiers in the service chain forwarding rule are SF1 and SF2 in sequence. In this case, a packet forwarded to SF2 is a packet returned after SF1 performs service processing. That is, the packet is first forwarded to SF1. After SF1 processes the packet and returns the packet, the packet returned by SF1 is received and forwarded to SF2 for processing.

Optionally, the forwarder may determine, according to a type of a network element, whether the service chain identifier is carried in the sent packet.

513. After completing a forwarding procedure corresponding to CID2, the forwarder forwards the packet to AF1 according to the network element identifier corresponding to CID1.

Optionally, because AF1 is a last hop in packet processing network elements, the forwarder may first remove the service chain identifier carried in the packet and then forward the packet to AF1.

514. After receiving the packet, AF1 forwards the packet to the terminal, so that the terminal receives the packet.

In the method provided by this embodiment, when a terminal completes an access procedure and initiates a service, a controller generates a new service chain forwarding rule according to a service setup request of the terminal, and forwards a packet to a service processing network element and an access network element in sequence according to a service processing network element identifier in the new service chain forwarding rule and an access network element identifier in an original service chain forwarding rule, so that SDN-mechanism-based control is implemented on the access network element in a scenario in which the terminal sets up the service. In this process, the access network element is used as a hop in service chain forwarding, no tunnel identifier needs to be used for routing the packet forwarded to the access network element, and unified control is performed by using a service chaining mechanism. In addition, based on a unified forwarding control mode on a control plane, forwarding control can be implemented on an access network and a service processing network, and therefore, service-chaining-based SDN access management and mobility management are implemented in a mobile network.

Figure 6:
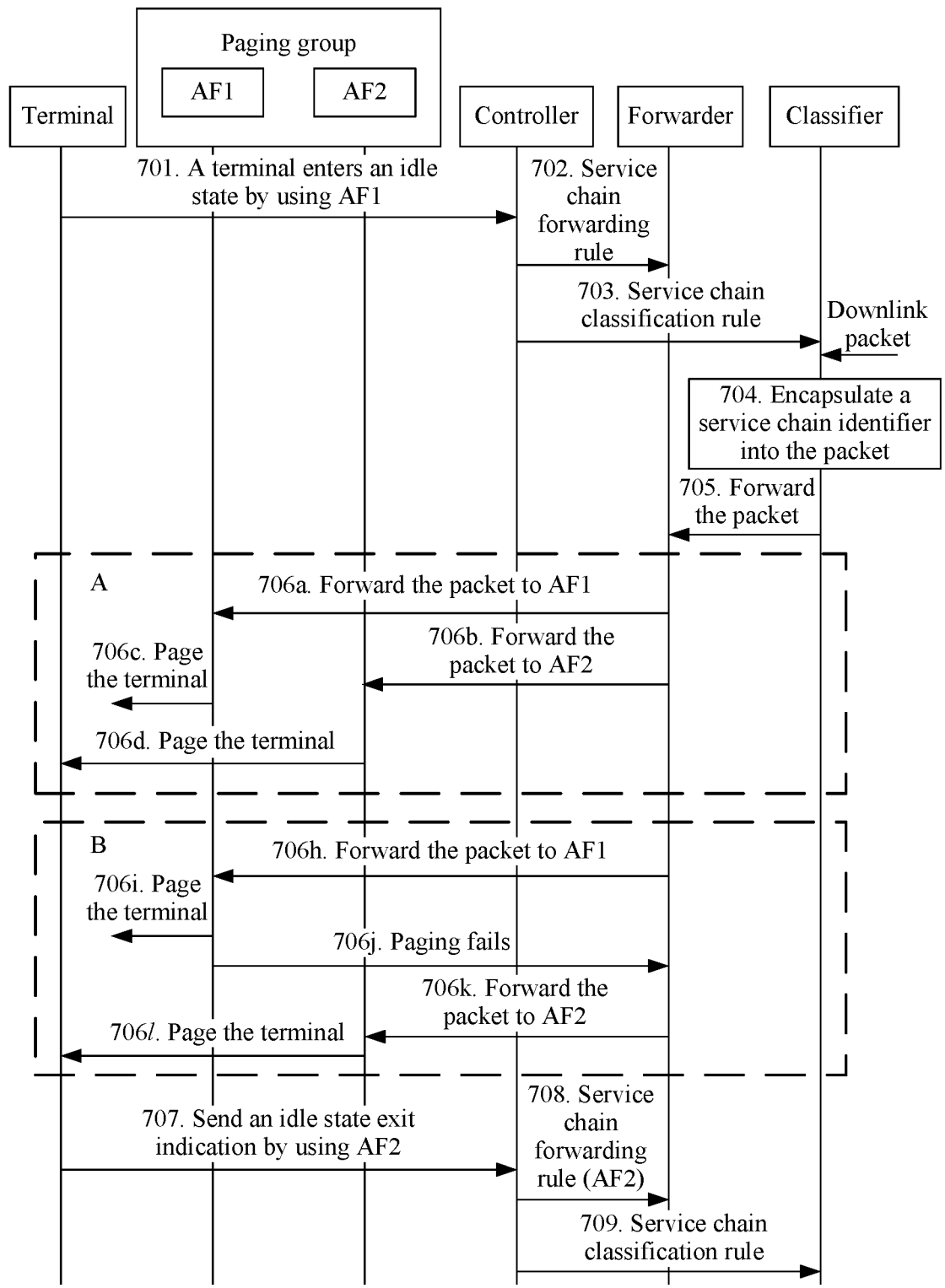
FIG. 6 is an interaction diagram of paging a terminal in an idle state according to another embodiment of the present invention.

Referring to FIG. 6, an embodiment of the present invention provides an access control method, applied to a scenario in which a terminal in an idle state is paged. The method includes the following steps.

701. A terminal has completed an access procedure by using an access network element AF1. This is the same as the embodiment shown in FIG. 3. Because the terminal has no service to transmit for a long time, the terminal notifies a controller by using AF1, that the terminal enters an idle state.

702. The controller sends, according to the notification that the terminal enters the idle state, a service chain forwarding rule to a forwarder for updating.

After receiving the service chain forwarding rule, the forwarder may replace an existing service chain forwarding rule with the service chain forwarding rule.

The service chain forwarding rule includes a service chain identifier CID1 corresponding to the terminal and a network element identifier. The network element identifier is identifiers of one or more access network elements in a paging group to which the terminal belongs. In this embodiment, an example in which the paging group includes two access network elements including AF1 and AF2 is used for description.

Optionally, the controller may further instruct the forwarder to report, to the controller, a packet corresponding to the service chain identifier.

703. This step is optional. The controller sends a service chain classification rule to a classifier for updating.

The service chain classification rule includes a parameter required by the forwarder for paging the terminal, in addition to a forwarding identifier of the terminal and the service chain identifier CID1. There may be one or more paging parameters, for example, a paging discontinuous reception (DRX for short) duration, and a paging priority. This is not specifically limited in this embodiment.

If the controller does not need to send the paging parameter to the classifier, this step may be canceled, and the classifier may use a service chain classification rule stored in the access procedure.

704. When the classifier receives a packet to be sent to the terminal and including a forwarding identifier of the terminal, the classifier encapsulates a service chain identifier CID1 into the packet according to the service chain classification rule.

Optionally, the classifier may further encapsulate the paging parameter into the packet simultaneously in a form of metadata.

705. The classifier sends the packet carrying the access information to the forwarder.

706. After receiving the packet, the forwarder forwards, according to an identifier, carried in the service chain forwarding rule, of one or more access network elements in a paging group to which the terminal belongs, the packet to the one or more access network elements in the paging group, and the one or more access network elements in the paging group page the terminal.

Either of the following methods A and B may be used by the forwarder to forward the packet in step 706 in this embodiment. The method A includes steps 706a-706d, where the packet is sent to each access network element in the paging group in broadcast mode. The method B includes steps 706h-706l, where the packet is sent to the access network elements in the paging group sequentially in a specified order, until an access network element pages the terminal successfully or all the access network elements fail to page the terminal.

Method A 706a and 706b. The forwarder sends the packet in broadcast mode to the access network elements AF1 and AF2 according to identifiers of AF1 and AF2 included in the service chain forwarding rule, or sends the packet to AF1 and AF2 in sequence.

Whether the forwarder forwards the packet to each access network element in the paging group in broadcast mode or sends the packet to each access network element in the paging group in sequence is not specifically limited in this embodiment. Specifically, the forwarder may perform forwarding according to a local preset policy, or may perform forwarding according to a policy carried in the service chain forwarding rule sent by the controller. This is not specifically limited in this embodiment.

706c. After receiving the packet, AF1 pages the terminal to determine whether the terminal is within coverage of AF1.

706d. After receiving the packet, AF2 pages the terminal to determine whether the terminal is within coverage of AF2.

Optionally, metadata of the packet includes a paging parameter. Therefore, the access network elements AF1 and AF2 may page the terminal according to the paging parameter.

Method B

706h. The forwarder first forwards the packet to the first access network element AF1 in the paging group in a specified order.

The specified sequence may be set according to a requirement. In this embodiment, the paging group includes two access network elements, and the specified sequence is AF1→AF2. In this case, the forwarder first forwards the packet to AF1 and then forwards the packet to AF2 in sequence.

706i. After receiving the packet, AF1 pages the terminal to determine whether the terminal is within coverage of AF1.

706j. AF1 fails to page the terminal, and returns the packet to the forwarder.

706k. After receiving the packet returned by AF1, the forwarder continues to forward the packet to AF2 according to the foregoing sequence, and triggers AF2 to continue to page the terminal.

706l. After receiving the packet, AF2 pages the terminal to determine whether the terminal is within coverage of AF2.

The foregoing process continues until an access network element in the paging group pages the terminal successfully, or all the access network elements in the paging group fail to page the terminal, or paging times out and consequentially the paging process fails.

Optionally, metadata in the packet received by the access network elements in the paging group includes a paging parameter. In this case, the access network elements AF1 and AF2 may page the terminal according to the paging parameter. Details are not described again herein.

707. In this embodiment, an example in which AF2 pages the terminal successfully is used for description. The terminal receives a paging message sent by AF2, and sends an idle state exit indication to the controller by using AF2 to indicate to the controller that the terminal may perform a service.

708. After receiving the idle state exit indication, the controller sends a service chain forwarding rule to the forwarder for updating, where the service chain forwarding rule includes the service chain identifier CID1 and the identifier of the corresponding access network element AF2. Therefore, all subsequent packets are forwarded by the forwarder to the access network element AF2.

709. This step is optional. If the packet carries a paging parameter in the foregoing process, the controller may send a service chain classification rule to the classifier for updating, instructing the classifier not to encapsulate the paging parameter into the packet. Afterward, the classifier needs to encapsulate only the service chain identifier. This avoids unnecessary transmission caused if the paging parameter is still carried in a subsequent packet forwarding process after completion of the paging.

In this embodiment, any one of the foregoing service chain forwarding rules may further include identifiers of other network elements, for example, an identifier of an SF. In this case, before the packet is sent to the access network element, the packet needs to be first sent to the other network elements for service processing. For details, refer to the description in the foregoing embodiment. Details are not described again herein.

In the method provided by this embodiment, after a terminal enters an idle state, a controller generates a service chain forwarding rule according to a notification that the terminal enters the idle state, and forwards, according to an identifier, carried in the service chain forwarding rule, of one or more access network elements in a paging group to which the terminal belongs, a packet to the one or more access network elements, so that SDN-mechanism-based control is implemented on the access network element in a scenario of paging the terminal in the idle state. In this process, the access network element is used as a hop in service chain forwarding, no tunnel identifier needs to be used for routing the packet forwarded to the access network element, and unified control is performed by using a service chaining mechanism. In addition, based on a unified forwarding control mode on a control plane, forwarding control can be implemented on an access network and a service processing network, and therefore, service-chaining-based SDN access management and mobility management are implemented in a mobile network.

Figure 7:
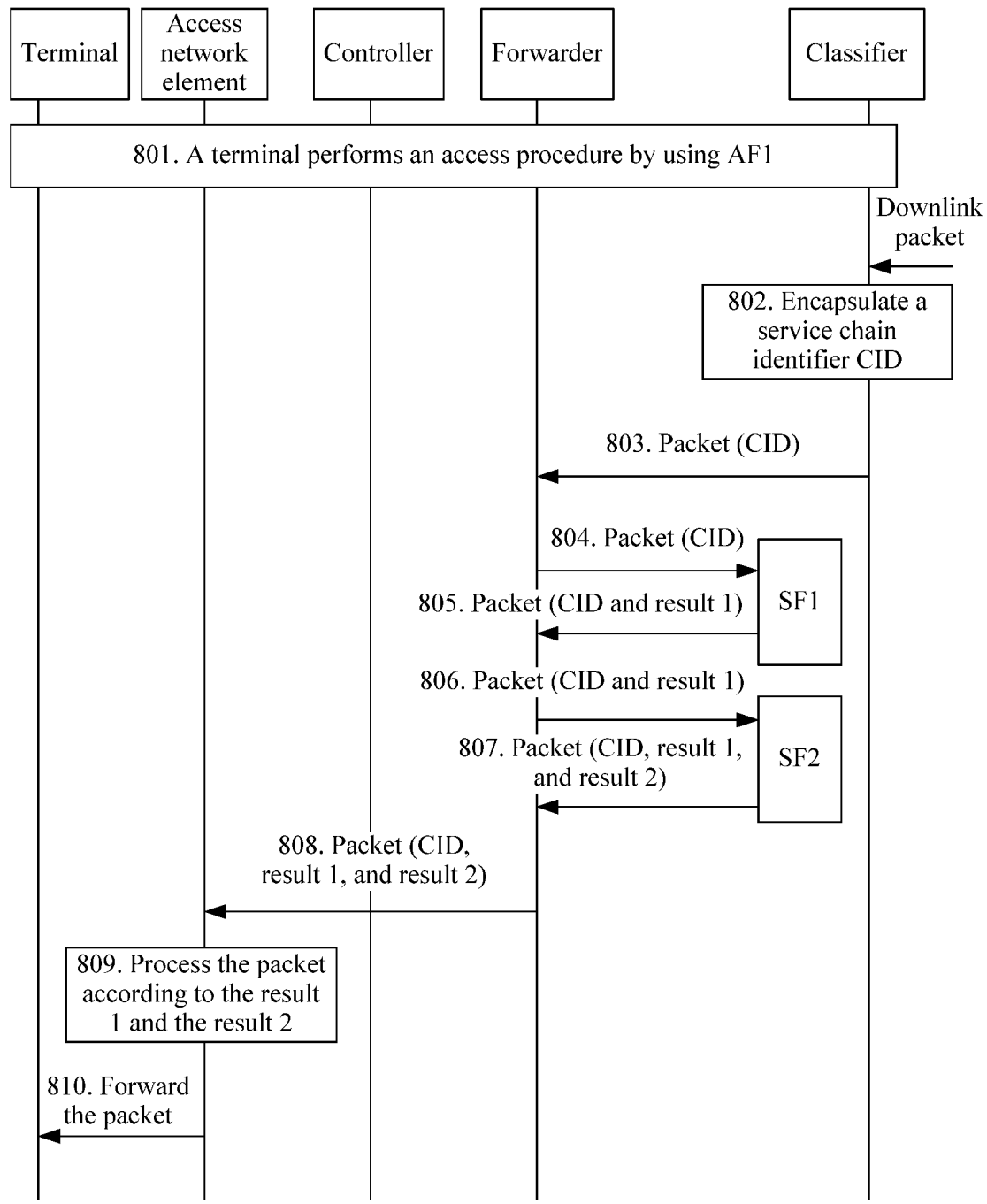
FIG. 7 is an interaction diagram of information sharing among multiple network elements according to another embodiment of the present invention.

Referring to FIG. 7, an embodiment of the present invention provides an access control method, applied to a scenario of information sharing among multiple network elements. The method includes the following steps.

801. It is the same as the foregoing steps 301-305. Details are not described again herein.

A controller sends a service chain classification rule and a service chain forwarding rule to a classifier and a forwarder respectively, indicating that a service packet of the terminal needs to be first processed by service processing network elements SF1 and SF2 and then forwarded by an access network element AF1. Herein, an example in which two network elements process the packet is used for description. In an actual application, certainly, more than two network elements, for example, three, five, or eight network elements, may process the packet. This is not specifically limited in this embodiment.

802. When a classifier receives a downlink packet to be sent to a terminal, the classifier matches a forwarding identifier in the packet with a forwarding identifier in a service chain classification rule, and if the matching succeeds, encapsulates a service chain identifier CID1 into the packet.

803. The classifier sends the packet carrying the service chain identifier to a forwarder.

804. After receiving the packet, the forwarder matches the service chain identifier carried in the packet with a service chain identifier in a service chain forwarding rule, and if the matching succeeds, obtains network element identifiers in the service chain forwarding rule. In this embodiment, an example in which the network element identifiers are SF1, SF2, and AF1 in sequence is used for description. The forwarder first sends the packet to the service processing network element SF1 according to the sequence.

That the service chain identifier carried in the packet successfully matches the service chain identifier in the service chain forwarding rule means that the service chain identifier carried in the packet is the same as the service chain identifier in the service chain forwarding rule. If the two identifiers are different, the matching fails.

805. After receiving the packet, the service processing network element SF1 performs service processing on the packet, encapsulates a service processing result into the packet, and returns the service-processed packet to the forwarder.

Optionally, SF1 may encapsulate a service processing result 1 into the packet in a form of metadata. For example, if SF1 is a DPI device, a result of deep inspection performed on the packet, such as a packet service type and a content URL, may be encapsulated into the packet in a form of metadata.

806. After receiving the packet returned by SF1, the forwarder continues to forward the packet to the service processing network element SF2 according to the foregoing sequence of the network element identifiers.

807. After receiving the packet, the service processing network element SF2 performs service processing on the packet, encapsulates a service processing result into the packet, and returns the service-processed packet to the forwarder.

Optionally, SF2 may encapsulate a service processing result 2 into the packet in a form of metadata. For example, if SF2 is a video codec, a video stream bit rate corresponding to the packet may be encapsulated into the packet in a form of metadata.

SF2 may add the service processing result to the packet, or may replace the service processing result of SF1. This is not specifically limited in this embodiment. For example, the service processing result of SF1 is only used for SF2 to process the packet. In this case, when SF2 encapsulates the processing result, a replacing manner may be used, and the packet processing result of SF1 does not need to be carried in the packet. Alternatively, the packet processing result of SF1 is not only used for SF2 to process the packet, but also used for SF1 to process the packet. In this case, when SF2 encapsulates the processing result, an adding manner may be used, and the processing result of SF1 is reserved. Therefore, when the packet is forwarded to the access network element, the packet processing result of SF1 may still be received. In this embodiment, an example in which SF2 encapsulates a service processing result in an adding manner is used for description. Therefore, the packet carries processing results of two network elements SF1 and SF2, namely, the foregoing result 1 and result 2.

808. After receiving the packet, the forwarder sends, according to the foregoing sequence of the network element identifiers, the packet carrying the processing results of SF1 and SF2 to the access network element AF1.

809. After receiving the packet, AF1 determines a forwarding mode according to the processing results carried in the packet.

For example, according to the packet service type provided by SF1, AF1 determines a forwarding priority required by the packet; according to the video stream bit rate provided by SF2, AF1 determines a forwarding bandwidth for the packet. In addition, before forwarding the packet, AF1 may further remove the service chain identifier and metadata encapsulated in the packet.

810. AF1 forwards the packet to the terminal according to the determined forwarding mode.

In the method provided by this embodiment, a controller generates a service chain forwarding rule, and completes forwarding of a packet to an access network element according to a network element identifier corresponding to a service chain identifier in the service chain forwarding rule, where the network element identifier includes an identifier of a service processing network element and an identifier of the access network element, and the packet carries a result of packet processing by the service processing network element. Therefore, information sharing among multiple network elements is implemented while SDN-mechanism-based control is performed on the access network element. In this process, the access network element is used as a hop in service chain forwarding, no tunnel identifier needs to be used for routing the packet forwarded to the access network element, and unified control is performed by using a service chaining mechanism. In addition, based on a unified forwarding control mode on a control plane, forwarding control can be implemented on an access network and a service processing network, and therefore, service-chaining-based SDN access management and mobility management are implemented in a mobile network.

Figure 8:
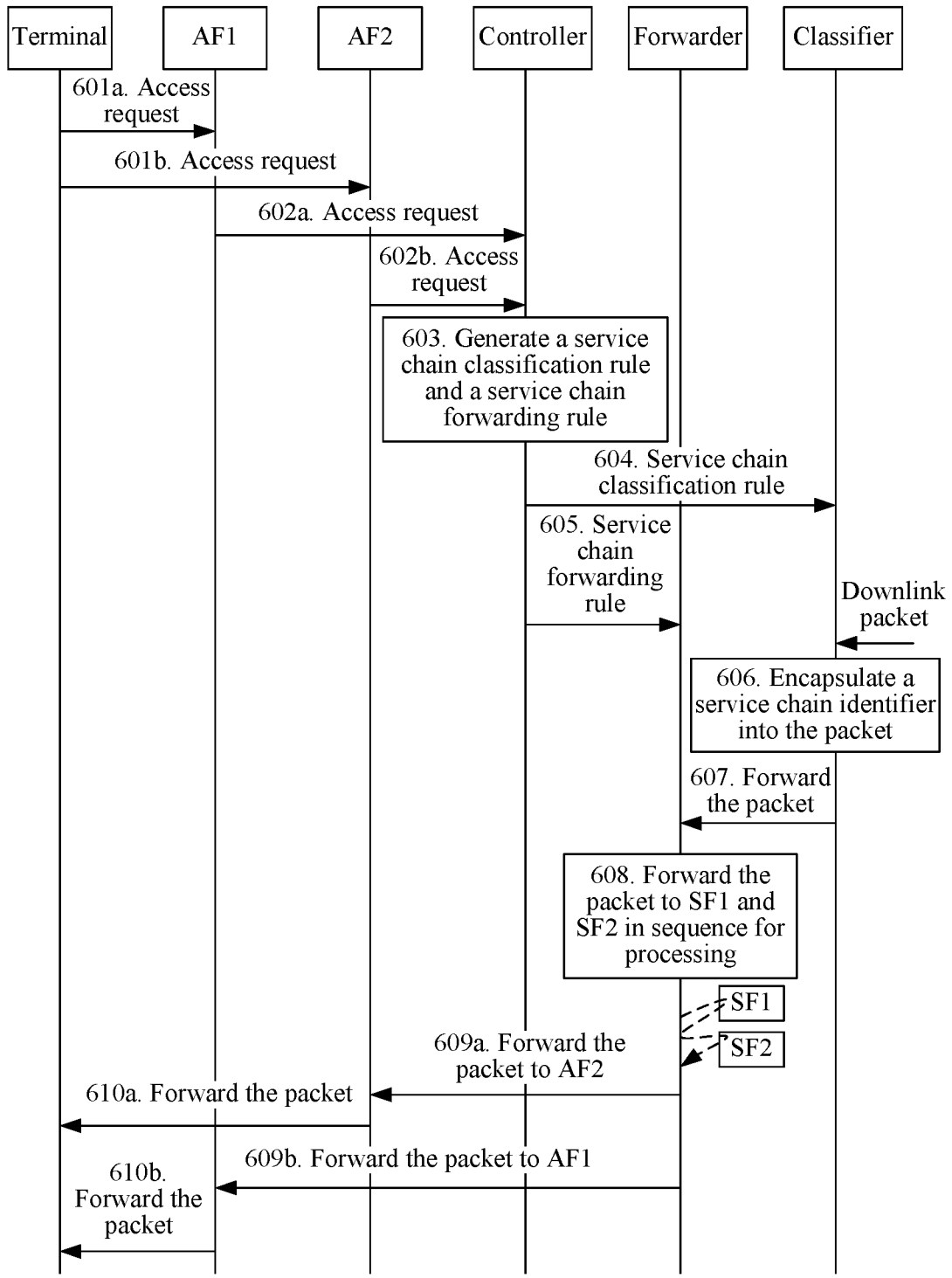
FIG. 8 is an interaction diagram of a scenario in which a terminal performs access by using multiple access network elements according to another embodiment of the present invention.

Referring to FIG. 8, an embodiment of the present invention provides an access control method, applied to a scenario in which a terminal requests access by using multiple access network elements. The method includes the following steps.

601a and 601b. A terminal initiates an access request to access network elements AF1 and AF2 separately.

The access network elements AF1 and AF2 may provide access services for the terminal by using a same type of access technology, for example, both are LTE eNodeBs, or may provide access services for the terminal by using different types of access technologies, for example, one is an LTE eNodeB, and the other is a WiFi AP. This is not specifically limited in this embodiment.

602a and 602b. The access network elements AF1 and AF2 send the access requests to a controller separately.

603. The controller generates a service chain classification rule and a service chain forwarding rule.

For example, the service chain classification rule is as follows:

Dst_IP=IP1|IP2, ChainID=CID1; where Dst_IP indicates a destination IP address, and ChainID indicates a service chain identifier. The service chain classification rule indicates that when a destination IP address of a packet is IP1 or IP2, a service chain identifier corresponding to the packet is CID1.

For example, the service chain forwarding rule is as follows:

ChainID=CID1; Forwarding=AF1+AF2;

where ChainID is the service chain identifier, and Forwarding is a network element identifier. The service chain forwarding rule indicates that a packet whose service chain identifier is CID1 is bicast to AF1 and AF2. If the openflow protocol is used to implement the bicast action, the action may be implemented by performing two output actions (parameters are a port that is connected to AF1 and a port that is connected to AF2 respectively).

Alternatively, the service chain forwarding rule is as follows:

ChainID=CID1; Forwarding=AF1|AF2;

where ChainID is the service chain identifier, and Forwarding is a network element identifier. The service chain forwarding rule indicates that one access network element is selected from AF1 and AF2 and that a packet whose service chain identifier is CID1 is sent to the selected access network element. Optionally, one access network element may be selected from AF1 and AF2 based on load balance. If the openflow protocol is used to implement the load balancing action, the action may be implemented by using a select action (by using two action chains respectively sent to the port that is connected to AF1 and the port that is connected to AF2) in a group flow table.

604. The controller sends the service chain classification rule to a classifier.

605. The controller sends the service chain forwarding rule to a forwarder.

In the foregoing example, the service chain forwarding rule includes only an identifier of an access network element, and in an actual application, may further include an identifier of a service processing network element. For example, the service chain forwarding rule is as follows:

ChainID=CID1; Forwarding=SF1, SF2, AF1+AF2;

where ChainID is the service chain identifier, and Forwarding is a network element identifier. The service chain forwarding rule indicates that a packet whose service chain identifier is CID1 is forwarded in sequence to service processing network elements whose network element identifiers are SF1 and SF2, and then bicast to AF1 and AF2.

Alternatively, the service chain forwarding rule is as follows:

ChainID=CID1; Forwarding=SF1, SF2, AF1|AF2;

where ChainID is the service chain identifier, and Forwarding is a network element identifier. The service chain forwarding rule indicates that a packet whose service chain identifier is CID1 is forwarded in sequence to service processing network elements whose network element identifiers are SF1 and SF2, then one access network element is selected from AF1 and AF2, and the packet is sent to the selected access network element. Optionally, one access network element may be selected from AF1 and AF2 based on load balance.

606. After a downlink packet to be sent to the terminal arrives at the classifier, the classifier matches a forwarding identifier in the packet with a forwarding identifier in the service chain classification rule, and if the matching succeeds, encapsulates a corresponding service chain identifier into the packet.

607. The classifier sends the packet carrying the service chain identifier to the forwarder.

608. After receiving the packet, the forwarder matches the service chain identifier carried in the packet with a service chain identifier in the service chain forwarding rule, and if the matching succeeds, obtains a network element identifier in the service chain forwarding rule. In this embodiment, an example in which the network element identifier includes an identifier of a service processing network element and an identifier of an access network element is used for description. According to a sequence of network element identifiers, the packet is first sent to a corresponding service processing network element for service processing.

That the service chain identifier carried in the packet successfully matches the service chain identifier in the service chain forwarding rule means that the service chain identifier carried in the packet is the same as the service chain identifier in the service chain forwarding rule. If the two identifiers are different, the matching fails.

In this embodiment, the forwarder first forwards the packet to SF1 and SF2 in sequence for service processing.

Optionally, the forwarder may determine, according to a type of a network element, whether the service chain identifier is carried in the sent packet.

609a and 609b. The forwarder forwards the packet according to access network element identifiers included in the service chain forwarding rule. In bicast mode, the packet is forwarded to AF1 and AF2 separately. Based on load balance, one access network element is selected from AF1 and AF2 and then the packet is forwarded to the selected access network element.

It should be noted that, the foregoing process may be further implemented in another manner.

The service chain forwarding rule may further include only an identifier of AF1 and an identifier of AF2. The forwarder may perform forwarding according to a local policy. If the local policy is a bicast policy, the packet is forwarded to AF1 and AF2 separately. If the local policy is a load balancing policy, one access network element is selected from AF1 and AF2 and then the packet is forwarded to the selected access network element.

Optionally, because AF1 and AF2 are last hops in processing network elements, the forwarder may remove the service chain identifier from the packet sent to AF1 and AF2.

610a and 610b. AF1 and AF2 send the received packet to the terminal, so that the terminal receives the packet.

In the method provided by this embodiment, a controller generates a service chain forwarding rule according to access requests of two access network elements, and completes forwarding of a packet to an access network element according to an access network element identifier in the service chain forwarding rule. The access network element identifier may be AF1 and AF2, and in this case, the packet may be forwarded in bicast mode. The access network element identifier may be AF1 or AF2, and in this case, the packet may be forwarded based on load balance. Therefore, SDN-mechanism-based control is implemented on an access network element in a scenario in which a terminal requests access by using multiple access network elements. In this process, the access network element is used as a hop in service chain forwarding, no tunnel identifier needs to be used for routing the packet forwarded to the access network element, and unified control is performed by using a service chaining mechanism. In addition, based on a unified forwarding control mode on a control plane, forwarding control can be implemented on an access network and a service processing network, and therefore, service-chaining-based SDN access management and mobility management are implemented in a mobile network. In addition, a forwarder may configure a local forwarding policy as a bicast policy or a load balancing policy, and forward the packet according to the local policy. A control mode is relatively flexible.

Figure 9:
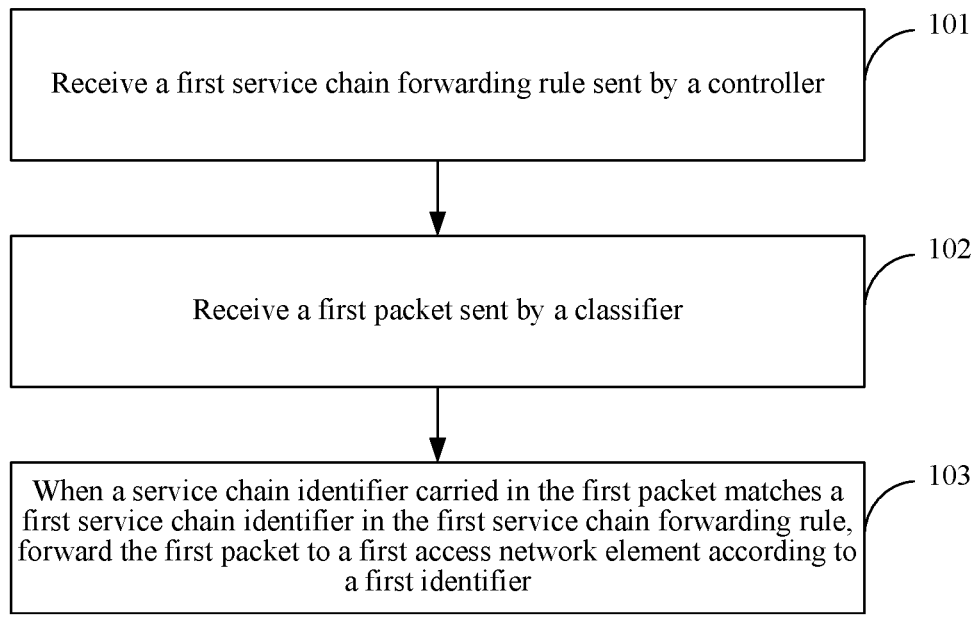
FIG. 9 is a flowchart of an access control method applied to a forwarder according to another embodiment of the present invention.

Referring to FIG. 9, an embodiment of the present invention provides an access control method, applicable to a forwarder. The method includes the following steps.

101. Receive a first service chain forwarding rule sent by a controller, where the first service chain forwarding rule includes a first service chain identifier corresponding to the terminal, and a first identifier of a first access network element, and the first identifier of the first access network element corresponds to the first service chain identifier.

102. Receive a first packet sent by a classifier, where the first packet carries a service chain identifier.

103. When the service chain identifier carried in the first packet matches the first service chain identifier in the first service chain forwarding rule, forward the first packet to the first access network element according to the first identifier of the first access network element.

In this embodiment, that the service chain identifier carried in the first packet matches the first service chain identifier in the first service chain forwarding rule means that the service chain identifier carried in the first packet is the same as the first service chain identifier in the first service chain forwarding rule. If the two identifiers are different, the matching fails.

In this embodiment, optionally, the first service chain forwarding rule is sent by the controller according to a first terminal access request, and the first terminal access request is initiated by the terminal through the first access network element.

In this embodiment, optionally, the method may further include: receiving a second service chain forwarding rule sent by the controller according to a terminal handover request, where the second service chain forwarding rule may include the first service chain identifier and a second identifier of a second access network element, the second access network element is an access network element to which the terminal is handed over, and the second identifier corresponds to the first service chain identifier; receiving a second packet sent by the classifier, where the second packet carries a service chain identifier; and when the service chain identifier carried in the second packet matches the first service chain identifier in the second service chain forwarding rule, forwarding the second packet to the second access network element according to the second identifier of the second access network element.

In this embodiment, optionally, the method may further include: receiving a third service chain forwarding rule sent by the controller according to a terminal handover request, where the third service chain forwarding rule may include the first service chain identifier, the first identifier of the first access network element, and a second identifier of a second access network element, the second access network element is an access network element to which the terminal is handed over, and the first service chain identifier corresponds to the first identifier and the second identifier; receiving a third packet sent by the classifier, where the third packet carries a service chain identifier; and when the service chain identifier carried in the third packet matches the first service chain identifier in the third service chain forwarding rule, forwarding the third packet to the first access network element and the second access network element according to the first identifier and the second identifier.

In this embodiment, optionally, the method may further include: receiving a fourth service chain forwarding rule sent by the controller according to a terminal service setup request, where the fourth service chain forwarding rule may include a second service chain identifier corresponding to a service of the terminal, and identifiers of one or more service processing network elements, the one or more service processing network elements are network elements for processing the service, and the second service chain identifier corresponds to the identifiers of the one or more service processing network elements; receiving a fourth packet sent by the classifier, where the fourth packet carries at least two service chain identifiers; when one of the at least two service chain identifiers carried in the fourth packet matches the second service chain identifier in the fourth service chain forwarding rule, forwarding the fourth packet to the one or more service processing network elements according to the identifiers of the one or more service processing network elements, for service processing; receiving the service-processed fourth packet sent by the one or more service processing network elements, where the service-processed fourth packet carries at least two service chain identifiers; and when one of the at least two service chain identifiers carried in the service-processed fourth packet matches the first service chain identifier in the first service chain forwarding rule, forwarding the service-processed fourth packet to the first access network element according to the first identifier.

In this embodiment, optionally, the service-processed fourth packet carries a result of the service processing performed by the one or more service processing network elements, so that the first access network element forwards the packet according to the result.

In this embodiment, optionally, the method may further include: receiving a fifth service chain forwarding rule sent by the controller according to a terminal idle state notification, where the fifth service chain forwarding rule may include the first service chain identifier and identifiers of one or more access network elements, the one or more access network elements are access network elements in a paging group to which the terminal belongs, and the first service chain identifier corresponds to the identifiers of the one or more access network elements; receiving a fifth packet sent by the classifier, where the fifth packet carries a service chain identifier; and when the service chain identifier carried in the fifth packet matches the first service chain identifier in the fifth service chain forwarding rule, forwarding the fifth packet to the one or more access network elements according to the identifiers of the one or more access network elements, to trigger the one or more access network elements to page the terminal.

In this embodiment, optionally, the forwarding the fifth packet to the one or more access network elements, to trigger the one or more access network elements to page the terminal may include: sending the fifth packet to the one or more access network elements in a specified order, until one of the one or more access network elements pages the terminal successfully or the one or more access network elements all fail to page the terminal.

In this embodiment, optionally, the first service chain forwarding rule may further include an identifier of at least one service processing network element corresponding to the first service chain identifier; and the forwarding the first packet to the first access network element according to the first identifier of the first access network element when the service chain identifier carried in the first packet matches the first service chain identifier in the first service chain forwarding rule may include: when the service chain identifier carried in the first packet matches the first service chain identifier in the first service chain forwarding rule, forwarding, according to the identifier of the at least one service processing network element, the first packet to the service processing network element corresponding to the identifier of the at least one service processing network element, for service processing; receiving the service-processed first packet sent by the service processing network element corresponding to the identifier of the at least one service processing network element; and forwarding the service-processed first packet to the first access network element according to the first identifier of the first access network element.

In this embodiment, optionally, the method may further include: before forwarding a to-be-forwarded packet to a next network element, if the next network element is an access network element, removing a service chain identifier carried in the to-be-forwarded packet, or if the next network element is not an access network element, reserving a service chain identifier carried in the to-be-forwarded packet; where the to-be-forwarded packet is the first packet or the service-processed first packet.

In this embodiment, optionally, the first service chain forwarding rule is sent by the controller according to a second terminal access request and a third terminal access request, the second terminal access request is initiated by the terminal through the first access network element, the third terminal access request is initiated by the terminal through the second access network element, the first service chain forwarding rule may further include the second identifier of the second access network element, and the second identifier of the second access network element corresponds to the first service chain identifier; and the forwarding the first packet to the first access network element according to the first identifier of the first access network element may include: selecting the first access network element from the first access network element and the second access network element based on load balance according to the first identifier and the second identifier, and forwarding the first packet to the first access network element.

In this embodiment, optionally, the first service chain forwarding rule is sent by the controller according to a second terminal access request and a third terminal access request, the second terminal access request is initiated by the terminal through the first access network element, the third terminal access request is initiated by the terminal through the second access network element, the first service chain forwarding rule may further include the second identifier of the second access network element, and the second identifier of the second access network element corresponds to the first service chain identifier; and the forwarding the first packet to the first access network element according to the first identifier of the first access network element may include: forwarding the first packet to the first access network element and the second access network element according to the first identifier and the second identifier.

In the method provided by this embodiment, a first service chain forwarding rule sent by a controller and a first packet sent by a classifier are received, and when a service chain identifier carried in the first packet matches a first service chain identifier in the first service chain forwarding rule, the first packet is forwarded to a first access network element according to a first identifier. In this process, the access network element is used as a hop in service chain forwarding, unified control is performed by using a service chaining mechanism, and SDN-based end-to-end control is implemented. In addition, based on a unified forwarding control mode on a control plane, forwarding control can be implemented on an access network and a service processing network. Therefore, service-chaining-based SDN access management and mobility management are implemented in a mobile network.

Figure 10:
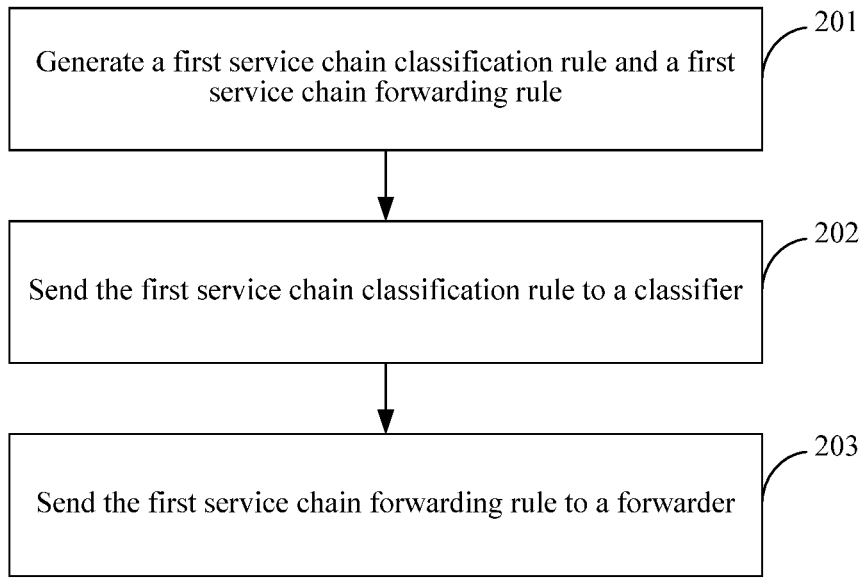
FIG. 10 is a flowchart of an access control method applied to a controller according to another embodiment of the present invention.

Referring to FIG. 10, an embodiment of the present invention provides an access control method, applicable to a controller. The method includes the following steps.

201. Generate a first service chain classification rule and a first service chain forwarding rule, where the first service chain classification rule includes a forwarding identifier allocated to a terminal and a first service chain identifier corresponding to the terminal, the forwarding identifier corresponds to the first service chain identifier, the first service chain forwarding rule includes at least the first service chain identifier and a first identifier of a first access network element, and the first service chain identifier corresponds to the first identifier.

202. Send the first service chain classification rule to a classifier, where the first service chain classification rule is used by the classifier to encapsulate the first service chain identifier into a received first packet including the forwarding identifier.

203. Send the first service chain forwarding rule to a forwarder, where the first service chain forwarding rule is used by the forwarder to forward the received first packet including the first service chain identifier to the first access network element.

In this embodiment, optionally, the generating a first service chain classification rule and a first service chain forwarding rule may include: after receiving a first terminal access request sent by the first access network element, generating the first service chain classification rule and the first service chain forwarding rule.

In this embodiment, optionally, the method may further include: after receiving a first terminal handover request, generating a second service chain forwarding rule, where the second service chain forwarding rule may include the first service chain identifier and a second identifier of a second access network element, the second access network element is an access network element to which the terminal is handed over, and the first service chain identifier corresponds to the second identifier; and sending the second service chain forwarding rule to the forwarder, where the second service chain forwarding rule is used by the forwarder to forward a received second packet including the first service chain identifier to the second access network element.

In this embodiment, optionally, the method may further include: after receiving a second terminal handover request, generating a third service chain forwarding rule, where the third service chain forwarding rule may include the first service chain identifier, the first identifier of the first access network element, and a second identifier of a second access network element, the second access network element is an access network element to which the terminal is handed over, and the first service chain identifier corresponds to the first identifier and the second identifier; and sending the third service chain forwarding rule to the forwarder, where the third service chain forwarding rule is used by the forwarder to forward a received third packet including the first service chain identifier to the first access network element and the second access network element.

In this embodiment, optionally, the method may further include: after receiving a terminal service setup request, generating a second service chain identifier corresponding to a requested service, and generating a second service chain classification rule and a fourth service chain forwarding rule, where the second service chain classification rule may include the forwarding identifier of the terminal and the second service chain identifier, the forwarding identifier corresponds to the second service chain identifier, the fourth service chain forwarding rule may include the second service chain identifier and identifiers of one or more service processing network elements for processing the service, and the second service chain identifier corresponds to the identifiers of the one or more service processing network elements; sending the second service chain classification rule to the classifier, where the second service chain classification rule is used by the classifier to encapsulate the second service chain identifier into a received fourth packet including the forwarding identifier; and sending the fourth service chain forwarding rule to the forwarder, where the fourth service chain forwarding rule is used by the forwarder to forward the received fourth packet including the second service chain identifier to the one or more service processing network elements.

In this embodiment, optionally, the method may further include: after receiving a terminal idle state notification, generating a fifth service chain forwarding rule, where the fifth service chain forwarding rule may include the first service chain identifier and identifiers of one or more access network elements, the one or more access network elements are access network elements in a paging group to which the terminal belongs, and the first service chain identifier corresponds to the identifiers of the one or more access network elements; and sending the fifth service chain forwarding rule to the forwarder, where the fifth service chain forwarding rule is used by the forwarder to forward a received fifth packet including the first service chain identifier to the one or more access network elements.

In this embodiment, optionally, the fifth service chain forwarding rule may further include a preset policy, so that the forwarder forwards, according to the preset policy, the received fifth packet including the first service chain identifier to the one or more access network elements.

In this embodiment, optionally, the method may further include: generating a third service chain classification rule, where the third service chain classification rule may include the forwarding identifier of the terminal, the first service chain identifier, and a paging parameter, and the forwarding identifier corresponds to the first service chain identifier and the paging parameter; and sending the third service chain classification rule to the classifier, where the third service chain classification rule is used by the classifier to encapsulate the first service chain identifier and the paging parameter into the received fifth packet including the forwarding identifier.

In this embodiment, optionally, the method may further include: after an indication indicating that the terminal exits an idle state and sent by the terminal after the terminal is successfully paged is received, generating a fourth service chain classification rule, where the fourth service chain classification rule may include the forwarding identifier of the terminal and the first service chain identifier, and the forwarding identifier corresponds to the first service chain identifier; and sending the fourth service chain classification rule to the classifier, where the fourth service chain classification rule is used by the classifier to encapsulate the first service chain identifier into a received sixth packet including the forwarding identifier.

In this embodiment, optionally, the generating a first service chain classification rule and a first service chain forwarding rule may include: after receiving a second terminal access request sent by the first access network element and a third terminal access request sent by the second access network element, generating the first service chain classification rule and the first service chain forwarding rule; where the forwarding identifier in the first service chain classification rule may include a first forwarding identifier allocated to the terminal according to the second terminal access request, or a second forwarding identifier allocated to the terminal according to the third terminal access request; and the first service chain forwarding rule may further include the second identifier of the second access network element, and the first service chain identifier further corresponds to the second identifier.

In this embodiment, optionally, the first service chain forwarding rule may further include an identifier of at least one service processing network element, so that the forwarder first forwards the first packet to the at least one service processing network element for service processing and then forwards the service-processed first packet to the first access network element.

In the method provided by this embodiment, a first service chain classification rule is generated and sent to a classifier, and a first service chain forwarding rule is generated and sent to a forwarder, so that the classifier encapsulates a service chain identifier into a packet and that the forwarder forwards the packet to an access network element after matching the service chain identifier. In this process, the access network element is used as a hop in service chain forwarding, unified control is performed by using a service chaining mechanism, and SDN-based end-to-end control is implemented. In addition, based on a unified forwarding control mode on a control plane, forwarding control can be implemented on an access network and a service processing network. Therefore, service-chaining-based SDN access management and mobility management are implemented in a mobile network. In addition, implementation of a controller is simplified, and sharing of associated information between the access network element and a service processing network element becomes possible.

Figure 11:
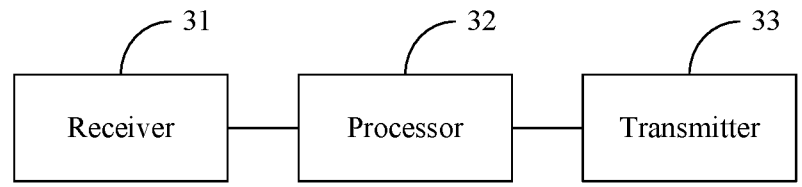
FIG. 11 is a structural diagram of an access control apparatus applied to a forwarder according to another embodiment of the present invention.

Referring to FIG. 11, an embodiment of the present invention provides an access control apparatus, applicable to a forwarder. The apparatus includes: a receiver 31, configured to receive a first service chain forwarding rule sent by a controller, where the first service chain forwarding rule may include a first service chain identifier corresponding to a terminal, and a first identifier of a first access network element, and the first identifier of the first access network element corresponds to the first service chain identifier; receive a first packet sent by a classifier, where the first packet carries a service chain identifier; a processor 32, configured to: when the service chain identifier carried in the first packet matches the first service chain identifier in the first service chain forwarding rule, determine, according to the first identifier of the first access network element, that the first packet is to be sent to the first access network element; and a transmitter 33, configured to forward the first packet to the first access network element.

That the service chain identifier carried in the first packet successfully matches the first service chain identifier in the first service chain forwarding rule means that the service chain identifier carried in the first packet is the same as the service chain identifier in the first service chain forwarding rule. If the two identifiers are different, the matching fails.

In this embodiment, optionally, the first service chain forwarding rule is sent by the controller according to a first terminal access request, and the first terminal access request is initiated by the terminal through the first access network element.

In this embodiment, optionally, the receiver may be further configured to: receive a second service chain forwarding rule sent by the controller according to a terminal handover request, where the second service chain forwarding rule may include the first service chain identifier and a second identifier of a second access network element, the second access network element is an access network element to which the terminal is handed over, and the second identifier corresponds to the first service chain identifier; and receive a second packet sent by the classifier, where the second packet carries a service chain identifier; the processor may be further configured to: when the service chain identifier carried in the second packet matches the first service chain identifier in the second service chain forwarding rule, determine, according to the second identifier of the second access network element, that the second packet is to be sent to the second access network element; and the transmitter may be further configured to: forward the second packet to the second access network element.

In this embodiment, optionally, the receiver may be further configured to: receive a third service chain forwarding rule sent by the controller according to a terminal handover request, where the third service chain forwarding rule may include the first service chain identifier, the first identifier of the first access network element, and a second identifier of a second access network element, the second access network element is an access network element to which the terminal is handed over, and the first service chain identifier corresponds to the first identifier and the second identifier; and receive a third packet sent by the classifier, where the third packet carries a service chain identifier; the processor may be further configured to: when the service chain identifier carried in the third packet matches the first service chain identifier in the third service chain forwarding rule, determine, according to the first identifier and the second identifier, that the third packet is to be sent to the first access network element and the second access network element; and the transmitter may be further configured to: forward the third packet to the first access network element and the second access network element.

In this embodiment, optionally, the receiver may be further configured to: receive a fourth service chain forwarding rule sent by the controller according to a terminal service setup request, where the fourth service chain forwarding rule may include a second service chain identifier corresponding to a service of the terminal, and identifiers of one or more service processing network elements, the one or more service processing network elements are network elements for processing the service, and the second service chain identifier corresponds to the identifiers of the one or more service processing network elements; and receive a fourth packet sent by the classifier, where the fourth packet carries at least two service chain identifiers; the processor may be further configured to: when one of the at least two service chain identifiers carried in the fourth packet matches the second service chain identifier in the fourth service chain forwarding rule, determine, according to the identifiers of the one or more service processing network elements, that the fourth packet is to be sent to the one or more service processing network elements; the transmitter may be further configured to: forward the fourth packet to the one or more service processing network elements for service processing; the receiver may be further configured to: receive the service-processed fourth packet sent by the one or more service processing network elements, where the service-processed fourth packet carries at least two service chain identifiers; the processor may be further configured to: when one of the at least two service chain identifiers carried in the service-processed fourth packet matches the first service chain identifier in the first service chain forwarding rule, determine, according to the first identifier, that the service-processed fourth packet is to be sent to the first access network element; and the transmitter may be further configured to: forward the service-processed fourth packet to the first access network element.

In this embodiment, optionally, the service-processed fourth packet carries a result of the service processing performed by the one or more service processing network elements, so that the first access network element may forward the packet according to the result.

In this embodiment, optionally, the receiver may be further configured to: receive a fifth service chain forwarding rule sent by the controller according to a terminal idle state notification, where the fifth service chain forwarding rule may include the first service chain identifier and identifiers of one or more access network elements, the one or more access network elements are access network elements in a paging group to which the terminal belongs, and the first service chain identifier corresponds to the identifiers of the one or more access network elements; and receive a fifth packet sent by the classifier, where the fifth packet carries a service chain identifier; the processor may be further configured to: when the service chain identifier carried in the fifth packet matches the first service chain identifier in the fifth service chain forwarding rule, determine, according to the identifiers of the one or more access network elements, that the fifth packet is to be sent to the one or more access network elements; and the transmitter may be further configured to: forward the fifth packet to the one or more access network elements, to trigger the one or more access network elements to page the terminal.

In this embodiment, optionally, the transmitter may be configured to: send the fifth packet to the one or more access network elements in a specified order, until one of the one or more access network elements pages the terminal successfully or the one or more access network elements all fail to page the terminal.

In this embodiment, optionally, the first service chain forwarding rule may further include an identifier of at least one service processing network element corresponding to the first service chain identifier; the processor may be configured to: when the service chain identifier carried in the first packet matches the first service chain identifier in the first service chain forwarding rule, determine, according to the identifier of the at least one service processing network element, that the first packet is to be sent to the service processing network element corresponding to the identifier of the at least one service processing network element; the transmitter may be further configured to: forward the first packet to the service processing network element corresponding to the identifier of the at least one service processing network element, for service processing; the receiver may be further configured to: receive the service-processed first packet sent by the service processing network element corresponding to the identifier of the at least one service processing network element; the processor may be further configured to: determine, according to the first identifier of the first access network element, that the service-processed first packet is to be sent to the first access network element; and the transmitter may be further configured to: forward the service-processed first packet to the first access network element.

In this embodiment, optionally, the processor may be further configured to: before the transmitter forwards a to-be-forwarded packet to a next network element, if the next network element is an access network element, remove a service chain identifier carried in the to-be-forwarded packet, or if the next network element is not an access network element, reserve a service chain identifier carried in the to-be-forwarded packet; where the to-be-forwarded packet is the first packet or the service-processed first packet.

In this embodiment, optionally, the first service chain forwarding rule is sent by the controller according to a second terminal access request and a third terminal access request, the second terminal access request is initiated by the terminal through the first access network element, the third terminal access request is initiated by the terminal through the second access network element, the first service chain forwarding rule may further include the second identifier of the second access network element, and the second identifier of the second access network element corresponds to the first service chain identifier; the processor may be configured to: select the first access network element from the first access network element and the second access network element based on load balance according to the first identifier and the second identifier; and the transmitter may be configured to: forward the first packet to the first access network element selected by the processor.

In this embodiment, optionally, the first service chain forwarding rule is sent by the controller according to a second terminal access request and a third terminal access request, the second terminal access request is initiated by the terminal through the first access network element, the third terminal access request is initiated by the terminal through the second access network element, the first service chain forwarding rule may further include the second identifier of the second access network element, and the second identifier of the second access network element corresponds to the first service chain identifier; the processor may be configured to: determine, according to the first identifier and the second identifier, that the first packet is to be sent to the first access network element and the second access network element; and the transmitter may be configured to: forward the first packet to the first access network element and the second access network element.

The apparatus provided by this embodiment receives a first service chain forwarding rule sent by a controller and a first packet sent by a classifier, and when a service chain identifier carried in the first packet matches a first service chain identifier in the first service chain forwarding rule, forwards the first packet to a first access network element according to a first identifier. In this process, the access network element is used as a hop in service chain forwarding, unified control is performed by using a service chaining mechanism, and SDN-based end-to-end control is implemented. In addition, based on a unified forwarding control mode on a control plane, forwarding control can be implemented on an access network and a service processing network, and therefore, service-chaining-based SDN access management and mobility management are implemented in a mobile network.

Figure 12:
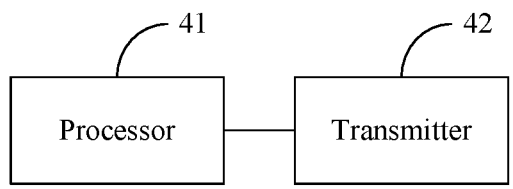
FIG. 12 is a structural diagram of an access control apparatus applied to a controller according to another embodiment of the present invention.

Referring to FIG. 12, an embodiment of the present invention provides an access control apparatus, applicable to a controller. The apparatus includes: a processor 41, configured to generate a first service chain classification rule and a first service chain forwarding rule, where the first service chain classification rule may include a forwarding identifier allocated to a terminal and a first service chain identifier corresponding to the terminal, the forwarding identifier corresponds to the first service chain identifier, the first service chain forwarding rule may include at least the first service chain identifier and a first identifier of a first access network element, and the first service chain identifier corresponds to the first identifier; and a transmitter 42, configured to send the first service chain classification rule to a classifier, where the first service chain classification rule may be used by the classifier to encapsulate the first service chain identifier into a received first packet including the forwarding identifier; send the first service chain forwarding rule to a forwarder, where the first service chain forwarding rule may be used by the forwarder to forward the received first packet including the first service chain identifier to the first access network element.

Figure 13:
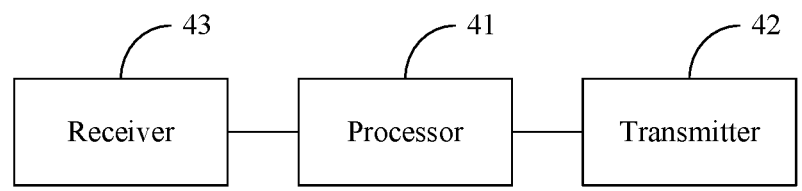
FIG. 13 is a structural diagram of an access control apparatus applied to a controller according to another embodiment of the present invention.

Referring to FIG. 13, the apparatus may further include: a receiver 43, configured to receive a first terminal access request sent by the first access network element; and the processor may be configured to: after the receiver receives the first terminal access request, generate the first service chain classification rule and the first service chain forwarding rule.

In this embodiment, optionally, the receiver may be further configured to receive a first terminal handover request; the processor may be further configured to: after the receiver receives the first terminal handover request, generate a second service chain forwarding rule, where the second service chain forwarding rule may include the first service chain identifier and a second identifier of a second access network element, the second access network element is an access network element to which the terminal is handed over, and the first service chain identifier corresponds to the second identifier; and the transmitter may be further configured to: send the second service chain forwarding rule to the forwarder, where the second service chain forwarding rule may be used by the forwarder to forward a received second packet including the first service chain identifier to the second access network element.

In this embodiment, optionally, the receiver may be further configured to receive a second terminal handover request; the processor may be further configured to: after the receiver receives the second terminal handover request, generate a third service chain forwarding rule, where the third service chain forwarding rule may include the first service chain identifier, the first identifier of the first access network element, and a second identifier of a second access network element, the second access network element is an access network element to which the terminal is handed over, and the first service chain identifier corresponds to the first identifier and the second identifier; and the transmitter may be further configured to: send the third service chain forwarding rule to the forwarder, where the third service chain forwarding rule may be used by the forwarder to forward a received third packet including the first service chain identifier to the first access network element and the second access network element.

In this embodiment, optionally, the receiver may be further configured to receive a terminal service setup request; the processor may be further configured to: after the receiver receives the terminal service setup request, generate a second service chain identifier corresponding to a requested service, and generate a second service chain classification rule and a fourth service chain forwarding rule, where the second service chain classification rule may include the forwarding identifier of the terminal and the second service chain identifier, the forwarding identifier corresponds to the second service chain identifier, the fourth service chain forwarding rule may include the second service chain identifier and identifiers of one or more service processing network elements for processing the service, and the second service chain identifier corresponds to the identifiers of the one or more service processing network elements; and the transmitter may be further configured to: send the second service chain classification rule to the classifier, where the second service chain classification rule may be used by the classifier to encapsulate the second service chain identifier into a received fourth packet including the forwarding identifier; and send the fourth service chain forwarding rule to the forwarder, where the fourth service chain forwarding rule may be used by the forwarder to forward the received fourth packet including the second service chain identifier to the one or more service processing network elements.

In this embodiment, optionally, the receiver may be further configured to receive a terminal idle state notification; the processor may be further configured to: after the receiver receives the terminal idle state notification, generate a fifth service chain forwarding rule, where the fifth service chain forwarding rule may include the first service chain identifier and identifiers of one or more access network elements, the one or more access network elements are access network elements in a paging group to which the terminal belongs, and the first service chain identifier corresponds to the identifiers of the one or more access network elements; and the transmitter may be further configured to: send the fifth service chain forwarding rule to the forwarder, where the fifth service chain forwarding rule may be used by the forwarder to forward a received fifth packet including the first service chain identifier to the one or more access network elements.

In this embodiment, optionally, the fifth service chain forwarding rule may further include a preset policy, so that the forwarder may forward, according to the preset policy, the received fifth packet including the first service chain identifier to the one or more access network elements.

In this embodiment, optionally, the processor may be further configured to: generate a third service chain classification rule, where the third service chain classification rule may include the forwarding identifier of the terminal, the first service chain identifier, and a paging parameter, and the forwarding identifier corresponds to the first service chain identifier and the paging parameter; and the transmitter may be further configured to: send the third service chain classification rule to the classifier, where the third service chain classification rule may be used by the classifier to encapsulate the first service chain identifier and the paging parameter into the received fifth packet including the forwarding identifier.

In this embodiment, optionally, the receiver may be further configured to receive an indication indicating that the terminal exits an idle state and sent by the terminal after the terminal is successfully paged; the processor may be further configured to: after the receiver receives the indication indicating that the terminal exits the idle state, generate a fourth service chain classification rule, where the fourth service chain classification rule may include the forwarding identifier of the terminal and the first service chain identifier, and the forwarding identifier corresponds to the first service chain identifier; and the transmitter may be further configured to: send the fourth service chain classification rule to the classifier, where the fourth service chain classification rule may be used by the classifier to encapsulate the first service chain identifier into a received sixth packet including the forwarding identifier.

In this embodiment, optionally, the receiver may be further configured to receive a second terminal access request sent by the first access network element and a third terminal access request sent by the second access network element; and the processor may be further configured to: after the receiver receives the second terminal access request and the third terminal access request, generate the first service chain classification rule and the first service chain forwarding rule; where the forwarding identifier in the first service chain classification rule may include a first forwarding identifier allocated to the terminal according to the second terminal access request, or a second forwarding identifier allocated to the terminal according to the third terminal access request; and the first service chain forwarding rule may further include the second identifier of the second access network element, and the first service chain identifier further corresponds to the second identifier.

In this embodiment, optionally, the first service chain forwarding rule may further include an identifier of at least one service processing network element, so that the forwarder first forwards the first packet to the at least one service processing network element for service processing and then forwards the service-processed first packet to the first access network element.

The apparatus provided by this embodiment generates a first service chain classification rule and sends the first service chain classification rule to a classifier, and generates a first service chain forwarding rule and sends the first service chain forwarding rule to a forwarder, so that the classifier encapsulates a service chain identifier into a packet and that the forwarder forwards the packet to an access network element after matching the service chain identifier. In this process, the access network element is used as a hop in service chain forwarding, unified control is performed by using a service chaining mechanism, and SDN-based end-to-end control is implemented. In addition, based on a unified forwarding control mode on a control plane, forwarding control can be implemented on an access network and a service processing network, and therefore, service-chaining-based SDN access management and mobility management are implemented in a mobile network. When the apparatus is applied to a controller, difficulty in implementing the controller is reduced, and at the same time, sharing of associated information between the access network element and a service processing network element becomes possible.

Figure 14:
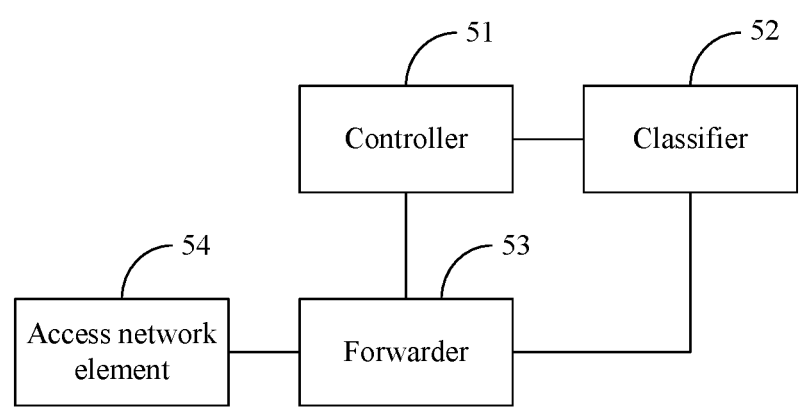
FIG. 14 is a structural diagram of an access control system according to another embodiment of the present invention.

Referring to FIG. 14, this embodiment provides an access control system, including: a controller 51, a classifier 52, a forwarder 53, and an access network element 54, where the controller 51 includes the access control apparatus provided by the embodiment shown in FIG. 12, or FIG. 13, and the forwarder includes the access control apparatus provided by the embodiment shown in FIG. 11.

The classifier 52 is configured to: receive a first service chain classification rule sent by the controller 51, and when receiving a first packet including a forwarding identifier of the terminal, encapsulate a first service chain identifier in the first service chain classification rule into the first packet; and the access network element 54 is configured to: receive the first packet sent by the forwarder 53, and forward the first packet to the terminal.

In this embodiment, optionally, the controller 51 may be further configured to: after receiving a terminal idle state notification, generate a second service chain classification rule, where the second service chain classification rule includes the forwarding identifier of the terminal, the first service chain identifier, and a paging parameter, and the forwarding identifier corresponds to the first service chain identifier and the paging parameter; and send the second service chain classification rule to the classifier; and the classifier 52 may be further configured to: receive the second service chain classification rule sent by the controller, and when receiving a second packet including the forwarding identifier of the terminal, encapsulate the first service chain identifier and the paging parameter into the second packet.

The first service chain identifier may be encapsulated into a header of the packet, and the paging parameter may be encapsulated into metadata.

After receiving the second service chain classification rule, the classifier 52 may replace the first service chain classification rule with the second service chain classification rule.

In this embodiment, optionally, the controller 51 may be further configured to: after an indication indicating that the terminal exits an idle state and sent by the terminal after the terminal is successfully paged is received, generate a third service chain classification rule, where the third service chain classification rule includes the forwarding identifier of the terminal and the first service chain identifier, and the forwarding identifier corresponds to the first service chain identifier; and send the third service chain classification rule to the classifier; and the classifier 52 may be further configured to: receive the third service chain classification rule sent by the controller, and when receiving a third packet including the forwarding identifier of the terminal, encapsulate the first service chain identifier into the third packet.

After receiving the third service chain classification rule, the classifier 52 may replace the second service chain classification rule with the third service chain classification rule.

In this embodiment, optionally, the system may further include: at least one service processing network element, configured to: receive a packet sent by the forwarder, perform service processing on the received packet, and send the service-processed packet to the forwarder; and the first service chain forwarding rule generated by the controller further includes an identifier of the at least one service processing network element.

In this embodiment, optionally, the access network element 54 may be further configured to: receive a packet of the terminal, encapsulate access information into the packet of the terminal, and forward the packet carrying the access information to the classifier.

The access information may be encapsulated into the packet in a form of metadata.

In the system provided by this embodiment, a controller generates a first service chain classification rule and sends the first service chain classification rule to a classifier, and generates a first service chain forwarding rule and sends the first service chain forwarding rule to a forwarder, so that the classifier encapsulates a service chain identifier into a packet, and that the forwarder forwards the packet to an access network element after matching the service chain identifier, and that the access network element forwards the packet to a terminal. In this process, the access network element is used as a hop in service chain forwarding, unified control is performed by using a service chaining mechanism, and SDN-based end-to-end control is implemented. In addition, based on a unified forwarding control mode on a control plane, forwarding control can be implemented on an access network and a service processing network, and therefore, service-chaining-based SDN access management and mobility management are implemented in a mobile network. When the apparatus is applied to the controller, difficulty in implementing the controller is reduced, and at the same time, sharing of associated information between the access network element and the service processing network element becomes possible.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. An apparatus comprising:
   a receiver configured to:
      receive a first service chain forwarding rule from a controller, wherein the first service chain forwarding rule comprises a first service chain identifier corresponding to a terminal, and a first identifier of a first access network element, wherein the first identifier of the first access network element corresponds to the first service chain identifier; and
      receive a first packet from a classifier, wherein the first packet carries a service chain identifier;
   a processor configured to:
      when the service chain identifier carried in the first packet matches the first service chain identifier in the first service chain forwarding rule, determine, according to the first identifier of the first access network element, that the first packet is to be sent to the first access network element; and
   a transmitter configured to forward the first packet to the first access network element.

2. The apparatus according to claim 1, wherein the receiver is further configured to:
   receive a fourth service chain forwarding rule from the controller, wherein the fourth service chain forwarding rule comprises a second service chain identifier corresponding to a service of the terminal, and identifiers of one or more service processing network elements, wherein the one or more service processing network elements are network elements for processing the service, and the second service chain identifier corresponds to the identifiers of the one or more service processing network elements; and receive a fourth packet from the classifier, wherein the fourth packet carries a plurality of service chain identifiers, wherein the processor is further configured to when one of the plurality of service chain identifiers carried in the fourth packet matches the second service chain identifier in the fourth service chain forwarding rule, determine, according to the identifiers of the one or more service processing network elements, that the fourth packet is to be sent to the one or more service processing network elements, wherein the transmitter is further configured to forward the fourth packet to the one or more service processing network elements for service processing, wherein the receiver is further configured to receive the service-processed fourth packet from the one or more service processing network elements, wherein the service-processed fourth packet carries a plurality of service chain identifiers, wherein the processor is further configured to, when one of the plurality of service chain identifiers carried in the service-processed fourth packet matches the first service chain identifier in the first service chain forwarding rule, determine, according to the first identifier, that the service-processed fourth packet is to be sent to the first access network element, and wherein the transmitter is further configured to forward the service-processed fourth packet to the first access network element.

3. The apparatus according to claim 2, wherein the service-processed fourth packet carries a result of the service processing performed by the one or more service processing network elements.

4. The apparatus according to claim 1, wherein the receiver is further configured to:

receive a fifth service chain forwarding rule from the controller, wherein the fifth service chain forwarding rule comprises the first service chain identifier and identifiers of one or more access network elements, the one or more access network elements are in a paging group to which the terminal belongs, and the first service chain identifier corresponds to the identifiers of the one or more access network elements; and receive a fifth packet from the classifier, wherein the fifth packet carries a service chain identifier, wherein the processor is further configured to when the service chain identifier carried in the fifth packet matches the first service chain identifier in the fifth service chain forwarding rule, determine, according to the identifiers of the one or more access network elements, that the fifth packet is to be sent to the one or more access network elements, and wherein the transmitter is further configured to forward the fifth packet to the one or more access network elements, to trigger the one or more access network elements to page the terminal.

5. The apparatus according to claim 1, wherein the first service chain forwarding rule further comprises an identifier of a service processing network element corresponding to the first service chain identifier, wherein the processor is configured to when the service chain identifier carried in the first packet matches the first service chain identifier in the first service chain forwarding rule, determine, according to the identifier of the service processing network element, that the first packet is to be sent to the service processing network element, wherein the transmitter is further configured to forward the first packet to the service processing network element, for service processing, wherein the receiver is further configured to receive the service-processed first packet from the service processing network element, wherein the processor is further configured to determine, according to the first identifier of the first access network element, that the service-processed first packet is to be sent to the first access network element, and wherein the transmitter is further configured to forward the service-processed first packet to the first access network element.

6. The apparatus according to claim 5, wherein the processor is further configured to before the transmitter forwards a to-be-forwarded packet to a next network element, when the next network element is an access network element, remove a service chain identifier carried in the to-be-forwarded packet, and when the next network element is not an access network element, reserve a service chain identifier carried in the to-be-forwarded packet, and wherein the to-be-forwarded packet is the first packet or the service-processed first packet.

7. The apparatus according to claim 1, wherein the first service chain forwarding rule further comprises a second identifier of a second access network element, and the second identifier of the second access network element corresponds to the first service chain identifier, wherein the processor is configured to select the first access network element from the first access network element and the second access network element based on load balance according to the first identifier and the second identifier, and wherein the transmitter is configured to forward the first packet to the first access network element selected by the processor.

8. The apparatus according to claim 1, wherein the first service chain forwarding rule further comprises a second identifier of a second access network element, and the second identifier of the second access network element corresponds to the first service chain identifier, wherein the processor is configured to determine, according to the first identifier and the second identifier, that the first packet is to be sent to the first access network element and the second access network element, and wherein the transmitter is configured to forward the first packet to the first access network element and the second access network element.

9. An apparatus comprising:

a processor configured to generate a first service chain classification rule and a first service chain forwarding rule, wherein the first service chain classification rule comprises a forwarding identifier allocated to a terminal and a first service chain identifier corresponding to the terminal, the forwarding identifier corresponds to the first service chain identifier, and wherein the first service chain forwarding rule comprises the first service chain identifier and a first identifier of a first access network element, and the first service chain identifier corresponds to the first identifier; and a transmitter configured to:
send the first service chain classification rule to a classifier, wherein the first service chain classification rule is used for encapsulation of the first service chain identifier into a received first packet comprising the forwarding identifier; and
send the first service chain forwarding rule to a forwarder, wherein the first service chain forwarding rule is for forwarding the received first packet comprising the first service chain identifier to the first access network element.

10. The apparatus according to claim 9, further comprising:
a receiver configured to receive a first terminal access request from the first access network element,
wherein the processor is configured to, after the receiver receives the first terminal access request, generate the first service chain classification rule and the first service chain forwarding rule.

11. The apparatus according to claim 10,
wherein the receiver is further configured to receive a first terminal handover request,
wherein the processor is further configured to after the receiver receives the first terminal handover request, generate a second service chain forwarding rule, wherein the second service chain forwarding rule comprises the first service chain identifier and a second identifier of a second access network element, the second access network element is an access network element to which the terminal is handed over, and the first service chain identifier corresponds to the second identifier, and
wherein the transmitter is further configured to send the second service chain forwarding rule to the forwarder, wherein the second service chain forwarding rule is used for forwarding a received second packet comprising the first service chain identifier to the second access network element.

12. The apparatus according to claim 10,
wherein the receiver is further configured to receive a second terminal handover request,
wherein the processor is further configured to after the receiver receives the second terminal handover request, generate a third service chain forwarding rule, wherein the third service chain forwarding rule comprises the first service chain identifier, the first identifier of the first access network element, and a second identifier of a second access network element, the second access network element is an access network element to which the terminal is handed over, and the first service chain identifier corresponds to the first identifier and the second identifier, and
wherein the transmitter is further configured to send the third service chain forwarding rule to the forwarder, wherein the third service chain forwarding rule is used for forwarding a received third packet comprising the first service chain identifier to the first access network element and the second access network element.

13. The apparatus according to claim 10,
wherein the receiver is further configured to receive a terminal service setup request,
wherein the processor is further configured to after the receiver receives the terminal service setup request, generate a second service chain identifier corresponding to a requested service, and generate a second service chain classification rule and a fourth service chain forwarding rule, wherein the second service chain classification rule comprises the forwarding identifier of the terminal and the second service chain identifier, the forwarding identifier corresponds to the second service chain identifier, the fourth service chain forwarding rule comprises the second service chain identifier and identifiers of one or more service processing network elements for processing the service, and the second service chain identifier corresponds to the identifiers of the one or more service processing network elements, and
wherein the transmitter is further configured to:
send the second service chain classification rule to the classifier, wherein the second service chain classification rule is used for encapsulation of the second service chain identifier into a received fourth packet comprising the forwarding identifier; and
send the fourth service chain forwarding rule to the forwarder, wherein the fourth service chain forwarding rule is used for forwarding the received fourth packet comprising the second service chain identifier to the one or more service processing network elements.

14. The apparatus according to claim 10,
wherein the receiver is further configured to receive a terminal idle state notification,
wherein the processor is further configured to after the receiver receives the terminal idle state notification, generate a fifth service chain forwarding rule, wherein the fifth service chain forwarding rule comprises the first service chain identifier and identifiers of one or more access network elements, the one or more access network elements are access network elements in a paging group to which the terminal belongs, and the first service chain identifier corresponds to the identifiers of the one or more access network elements, and
wherein the transmitter is further configured to send the fifth service chain forwarding rule to the forwarder, wherein the fifth service chain forwarding rule is used for forwarding a received fifth packet comprising the first service chain identifier to the one or more access network elements.

15. The apparatus according to claim 14, wherein the fifth service chain forwarding rule further comprises a preset policy, wherein the preset policy is used for forwarding the received fifth packet comprising the first service chain identifier to the one or more access network elements.

16. The apparatus according to claim 10,
wherein the processor is further configured to generate a third service chain classification rule, wherein the third service chain classification rule comprises the forwarding identifier of the terminal, the first service chain identifier, and a paging parameter, and the forwarding identifier corresponds to the first service chain identifier and the paging parameter, and
wherein the transmitter is further configured to send the third service chain classification rule to the classifier, wherein the third service chain classification rule is used for encapsulation of the first service chain identifier and the paging parameter into the received fifth packet comprising the forwarding identifier.

17. The apparatus according to claim 16,
wherein the receiver is further configured to receive an indication indicating that the terminal exits an idle state and sent by the terminal after the terminal is successfully paged,
wherein the processor is further configured to after the receiver receives the indication indicating that the terminal exits the idle state, generate a fourth service chain classification rule, wherein the fourth service chain classification rule comprises the forwarding identifier of the terminal and the first service chain identifier, and the forwarding identifier corresponds to the first service chain identifier, and
wherein the transmitter is further configured to send the fourth service chain classification rule to the classifier, wherein the fourth service chain classification rule is used for encapsulation of the first service chain identifier into a received sixth packet comprising the forwarding identifier.

18. The apparatus according to claim 10,
wherein the receiver is further configured to receive a second terminal access request from the first access network element and a third terminal access request from a second access network element, and
wherein the processor is further configured to after the receiver receives the second terminal access request and the third terminal access request, generate the first service chain classification rule and the first service chain forwarding rule,
wherein the forwarding identifier in the first service chain classification rule comprises a first forwarding identifier allocated to the terminal according to the second terminal access request, or a second forwarding identifier allocated to the terminal according to the third terminal access request, and
wherein the first service chain forwarding rule further comprises the second identifier of the second access network element, and the first service chain identifier further corresponds to the second identifier.

19. The apparatus according to claim 9, wherein the first service chain forwarding rule further comprises an identifier of at least one service processing network element.

20. A method comprising:
receiving a first service chain forwarding rule from a controller, wherein the first service chain forwarding rule comprises a first service chain identifier corresponding to a terminal and a first identifier of a first access network element, and the first identifier corresponds to the first service chain identifier;
receiving a first packet from a classifier, wherein the first packet carries a service chain identifier; and
when the service chain identifier carried in the first packet matches the first service chain identifier in the first service chain forwarding rule, forwarding the first packet to the first access network element according to the first identifier of the first access network element.

* * * * *